(12) United States Patent
Ohnishi

(10) Patent No.: US 7,393,108 B2
(45) Date of Patent: Jul. 1, 2008

(54) IMAGING DISTURBING METHOD AND SYSTEM

(75) Inventor: Michihiro Ohnishi, Kanagawa (JP)

(73) Assignee: Sony Corporation, Tokyo (JP)

(*) Notice: Subject to any disclaimer, the term of this patent is extended or adjusted under 35 U.S.C. 154(b) by 754 days.

(21) Appl. No.: 10/398,682

(22) PCT Filed: Aug. 5, 2002

(86) PCT No.: PCT/JP02/07965

§ 371 (c)(1),
(2), (4) Date: Sep. 22, 2003

(87) PCT Pub. No.: WO03/016997

PCT Pub. Date: Feb. 27, 2003

(65) Prior Publication Data

US 2004/0109562 A1 Jun. 10, 2004

(30) Foreign Application Priority Data

Aug. 10, 2001 (JP) ............................. 2001-244712

(51) Int. Cl.
G03B 21/14 (2006.01)

(52) U.S. Cl. ...................... 353/30; 380/201; 353/122

(58) Field of Classification Search .................. 353/30, 353/31, 94, 122; 434/286; 352/244; 380/201, 380/54
See application file for complete search history.

(56) References Cited

U.S. PATENT DOCUMENTS

| 5,959,717 | A | 9/1999 | Chaum |
| 6,018,374 | A | 1/2000 | Wrobleski |
| 6,624,874 | B2 * | 9/2003 | Revelli et al. ................. 352/90 |
| 6,809,792 | B1 * | 10/2004 | Tehranchi et al. ............ 352/85 |
| 6,827,454 | B2 * | 12/2004 | Kimura et al. ............... 353/122 |
| 6,950,532 | B1 * | 9/2005 | Schumann et al. .......... 382/100 |
| 7,018,045 | B2 * | 3/2006 | Tomita ........................ 353/31 |
| 7,043,019 | B2 * | 5/2006 | Tehranchi et al. ........... 380/218 |
| 7,137,710 | B2 * | 11/2006 | May ........................... 353/122 |
| 7,218,754 | B2 * | 5/2007 | Schumann et al. .......... 382/100 |
| 7,221,759 | B2 * | 5/2007 | Nelson ........................ 380/54 |
| 2005/0041804 | A1 * | 2/2005 | Mese et al. .................... 380/54 |

FOREIGN PATENT DOCUMENTS

| EP | 1 301 034 | 4/2003 |
| JP | 2001-211433 | 8/2001 |
| WO | WO 00 74366 | 12/2000 |
| WO | WO 01 33846 | 5/2001 |

* cited by examiner

Primary Examiner—William C. Dowling
(74) Attorney, Agent, or Firm—Frommer Lawrence & Haug LLP; William S. Frommer; Thomas F. Presson

(57) ABSTRACT

A method of preventing image capturing that radiates a visible light that because of the human vision characteristics, an optical image for the visible light for the interference is difficult to distinguish from an image being projected onto the screen and because of the characteristics of an image capturing, an optical image for the visible light for the interference is recorded and distinguishable from the image on the screen, when the image on the screen is illegally reproduced.

18 Claims, 23 Drawing Sheets

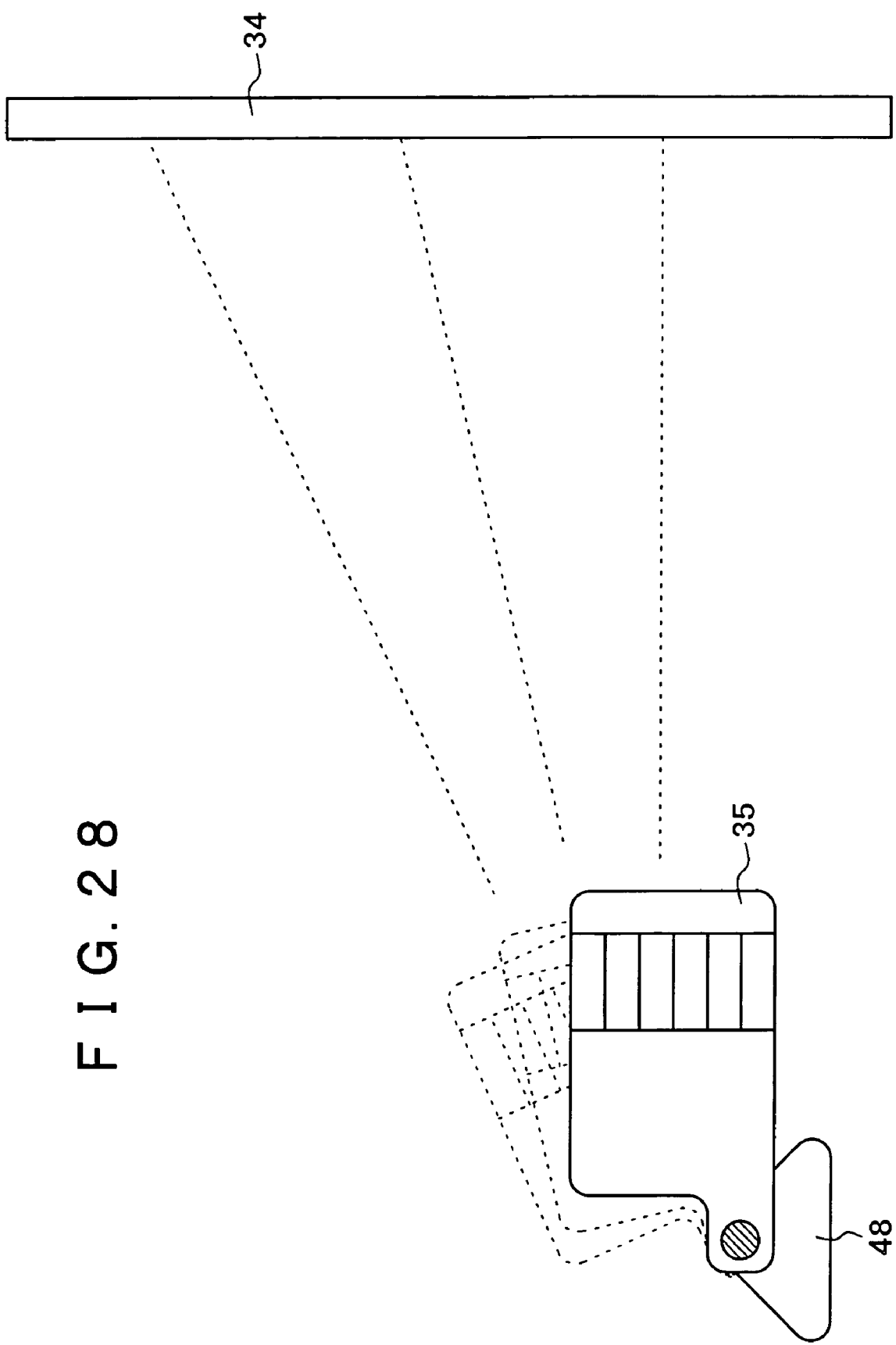

IMAGING DISTURBING METHOD AND SYSTEM

TECHNICAL FIELD

The present invention relates to a technology for interfering against an illegal reproduction of an image from a screen in a projection system.

BACKGROUND ART

The U.S. Pat. No. 6,018,374 proposes a technology for interfering against such an illegal activity. This technology is based on a difference between the characteristics of human vision and the image capturing characteristics of image capturing cameras and uses an infrared light as a means of interference. Specifically, an infrared radiation apparatus, which is placed at a position close to or far away from an image projector, radiates an infrared light on a screen, so that a reflective light may radiate into an image capturing camera belonging to an individual who is engaged in an illegal activity. In other words, the illegally captured image may record the optical images of the infrared light that is unrelated to the image being presented. As a result, the quality may be lost in the image, that has been illegally captured, and, in some cases, the illegal activity may be identified. Of course, the infrared light is undetectable to a human, and the viewer may not experience any difficulty viewing the image being presented.

Such a use of the infrared light may make it possible to realize an adequate interference effect and prevention effect. However, a diverse interference technology needs to be established in order to protect critical contents.

DISCLOSURE OF THE INVENTION

The present invention proposes a technology for interfering against image capturing using a visible light that satisfies the following conditions:

Condition 1: Human visual characteristics make it difficult to distinguish between an optical image of the visible light for the interference and an image projected on a screen.

Condition 2: Because of the image capturing characteristics of a means of image capturing, the optical image of the visible light for the interference may be distinguishable from the image on the screen in a recording, when the image on the screen is illegally captured.

An effect similar to the case of infrared light may be realized using the visual light that satisfies these conditions. In other words, information and images, that are not in the content being presented, may be viewed in an image that has been illegally captured but may not be recognizable during a normal viewing.

BRIEF DESCRIPTION OF THE DRAWINGS

FIG. 28 is a diagram showing an example of a way in which the visible light radiation apparatus and a radiation direction driver apparatus are attached.

BEST MODE OF CARRYING OUT THE INVENTION

Figure 1:
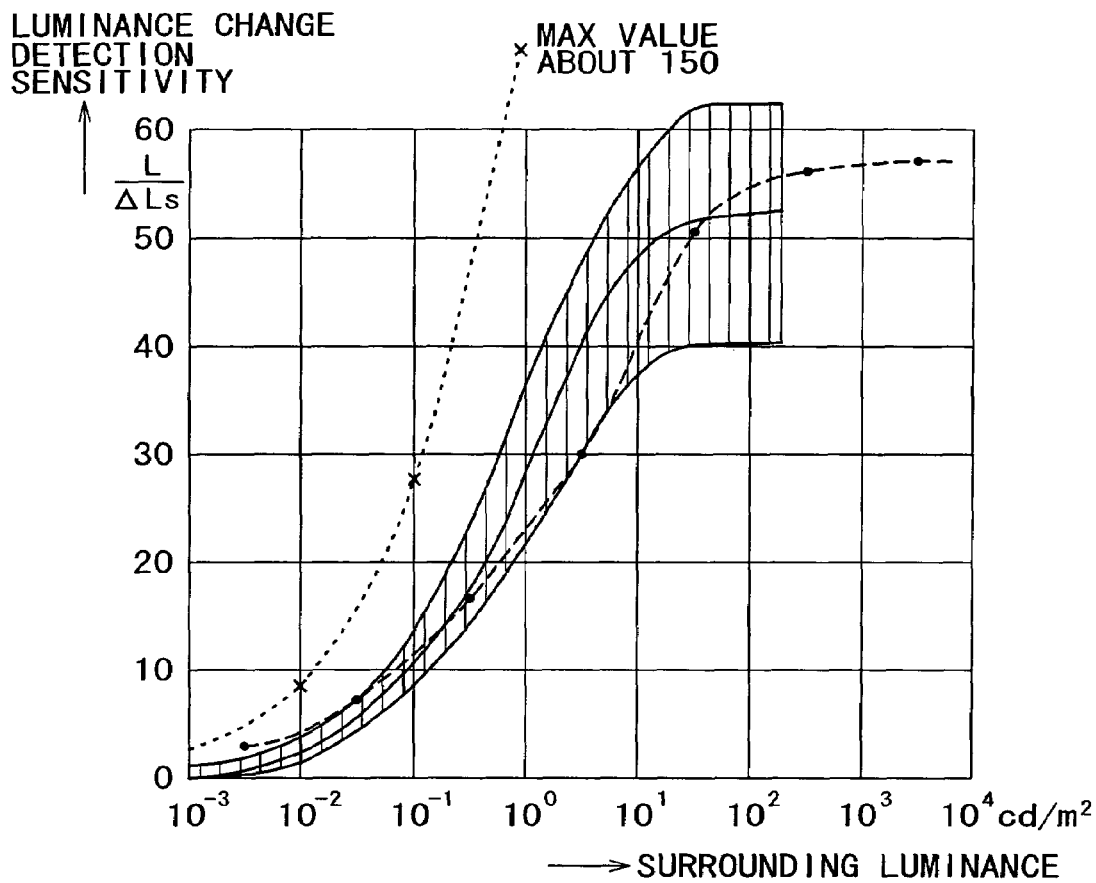
FIG. 1 is a diagram showing the characteristics for the human increment threshold for contrast sensitivity.

(A) Basic Principle (A-1) Conditions Required for Visible Light

A visible light that satisfies the conditions 1 and 2, which were described earlier, may provide an interference effect mentioned earlier. These conditions were established through research efforts over the years by the inventors on the human vision characteristics, which have been applied on the present field of technology. These conditions are satisfied by controlling the luminance and chromaticity of the visible light for the interference as described next.

Firstly, chromaticity conditions will be described. For example, when the visible light for the interference and the image being presented are radiated so as to overlap together, it is required that the chromaticity of the visible light for the interference and the chromaticity of the image being presented match or only be slightly off to a degree that may not affect the human vision. Of course, this is to keep the visible light for the interference from being detectable by the human vision.

Therefore, when the image being presented is in color, visible light of different chromaticities are radiated in accordance with overlapping positions within a single image. Of course, if the image being presented is a video image, then the chromaticity may be changed in response to changes of the video image even at a same position of overlap on the screen. If the image being presented is in black and white, then the visible light for the interference does not have to be of varying chromaticity, as long as the chromaticity of the visible light for the interference matches with the color temperature on the screen (image). In other words, the visible light for the interference may remain undetectable by the viewer even as the chromaticity remains constant.

When the visible light for the interference is radiated from a space outside of the screen toward the individual engaged in the illegal activity, the chromaticity of the visible light for the interference should match the chromaticity of the background where the radiation originates. The background chromaticity may be almost constant in most cases, or the chromaticity may also change gradually. Therefore, a visible light of a predetermined chromaticity may be radiated or the chromaticity of the visible light may be controlled based on actual measurement results.

By the way, a difference in the background for the visible light for the interference, i.e. whether the background is a part of the image being presented, is not an essential issue in determining the conditions that the visible light for the interference must satisfy. Therefore, the descriptions below will relate to instances in which the visible light for the interference and the image being presented are overlapped, unless specified otherwise.

Luminance conditions will be described next. The higher is the luminance of the visible light for the interference, the more likely will the shape of the visible light be recognized by the viewer as a noise on the screen. As a result, the viewer will experience a difficulty in viewing the presentation. Therefore, a luminance of the visible light for the interference is required to be approximately the same or less than the viewer's contrast sensitivity increment threshold.

The contrast sensitivity increment threshold is a value defined as follows, when a visual target is viewed within a background light. When the luminance of the visual target is enhanced with respect to the luminance of the background light, an observer may detect a difference between the two, as soon as a difference in luminance is greater than or equal to a certain value. A minimum difference in luminance, at which such a difference is detected, corresponds to the above-mentioned contrast sensitivity increment threshold.

Therefore, it is possible to keep the viewer from detecting an increase in luminance in an area of overlap, as long as the luminance of the visible light for the interference is controlled to be at approximately the same level or a lower level than the increment threshold, which is calculated based on the luminance of the image being presented, with which the overlap takes place. In other words, information other than the main feature presentation may be superimposed without disturbing the audience's viewing.

Although the contrast sensitivity increment threshold may be measured for each viewer, appropriate results may also be obtained in general by taking advantage of research results from the past. For example, Section 2, Chapter 3 of a reference material "Light and Illumination" (Hanz Jurgen Henschell, translated by Reo Mori, Nippon Rikou Shuppankai, Tokyo, 1995) may be used as a reference.

FIG. 1 shows a relationship between an adaptation luminance (surrounding luminance) L and a luminance ratio sensitivity $L/\Delta Ls$ in a field vision for testing with a visual angle of greater than or equal to a 1 degree. In this figure, $\Delta Ls$ is an increment threshold, while L is an adaptation luminance (surrounding luminance). As shown in FIG. 1, the relationship between the adaptation luminance (surrounding luminance) and the luminance contrast sensitivity does not remain constant. Nor does the increment threshold $\Delta Ls$ increase without a limit in proportion to the adaptation luminance (surrounding luminance L).

Furthermore, according to Paragraph 1, Section 1, Chapter 4 of another reference, "Bio-information system theory" (Tadahiko Fukuda, Sangyo Tosho, Tokyo, 1995), the increment threshold in general can be easily calculated using the Stevens Law. According to the Stevens Rule, the increment threshold $\Delta Ls$ can be expressed by the following equation.

$$\Delta Ls = k(L-L')^\wedge b \qquad (1)$$

where L is an adaptation luminance, L' is an absolute luminance threshold, and k and b are constants and are values that change with viewing conditions.

Information other than the main feature presentation can be superimposed with the image being presented without being detected by the majority of viewers by controlling the radiation of the visible light for the interference at a luminance that is lower than or equal to a value thus calculated.

By the way, video camera's sensitivity in distinguishing a difference in the optical intensity is not very different from the increment threshold of the human eyes. For this reason, the inventors focused on a difference between the optical spectrum sensitivity curve (relative luminous efficiency) for the human eyes and the optical spectrum sensitivity curve (sensitivity to the received light at various wavelengths) for the video camera, in order to examine additional conditions.

Figure 2:
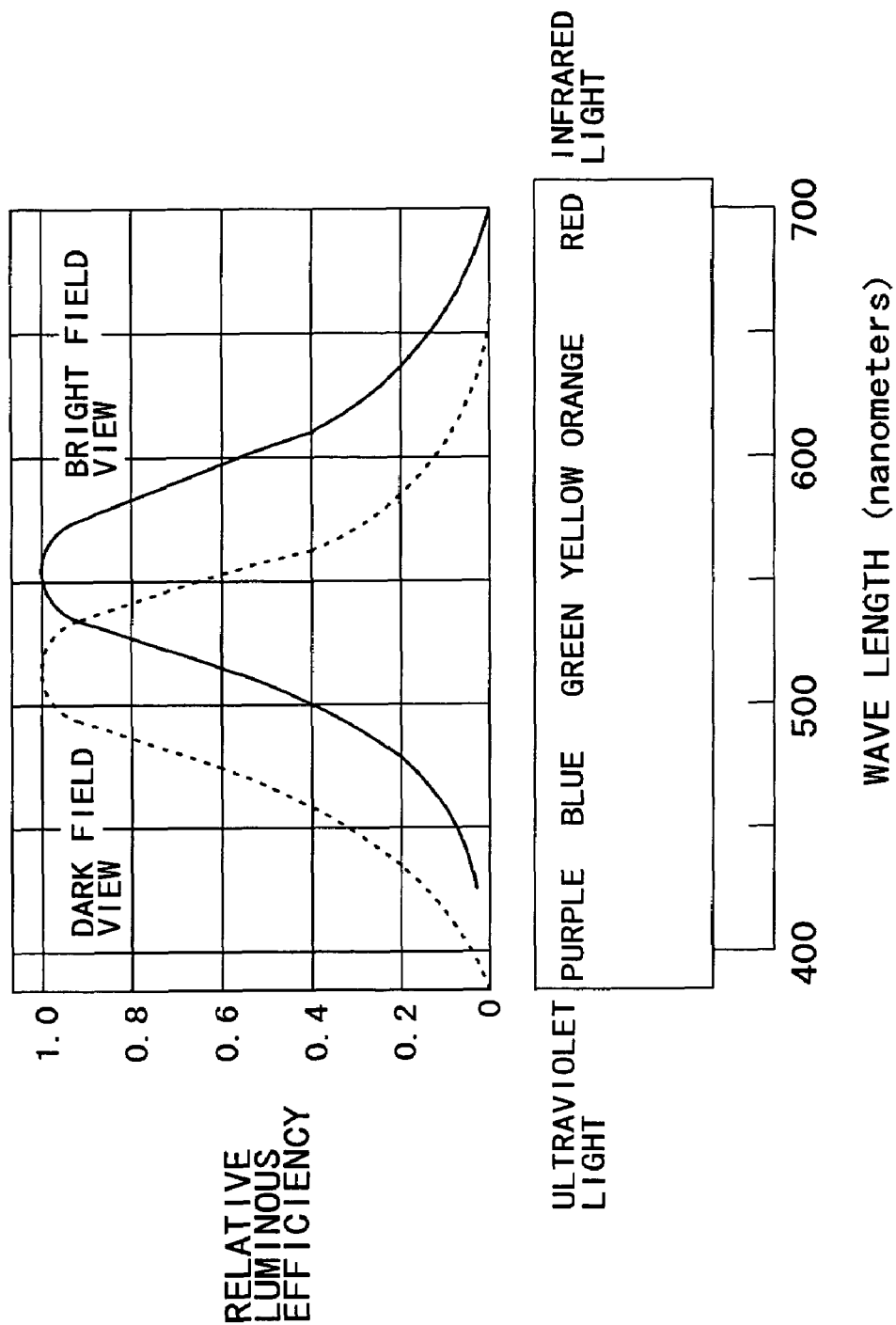
FIG. 2 is a diagram showing a human optical spectrum sensitivity curve.
Figure 3:
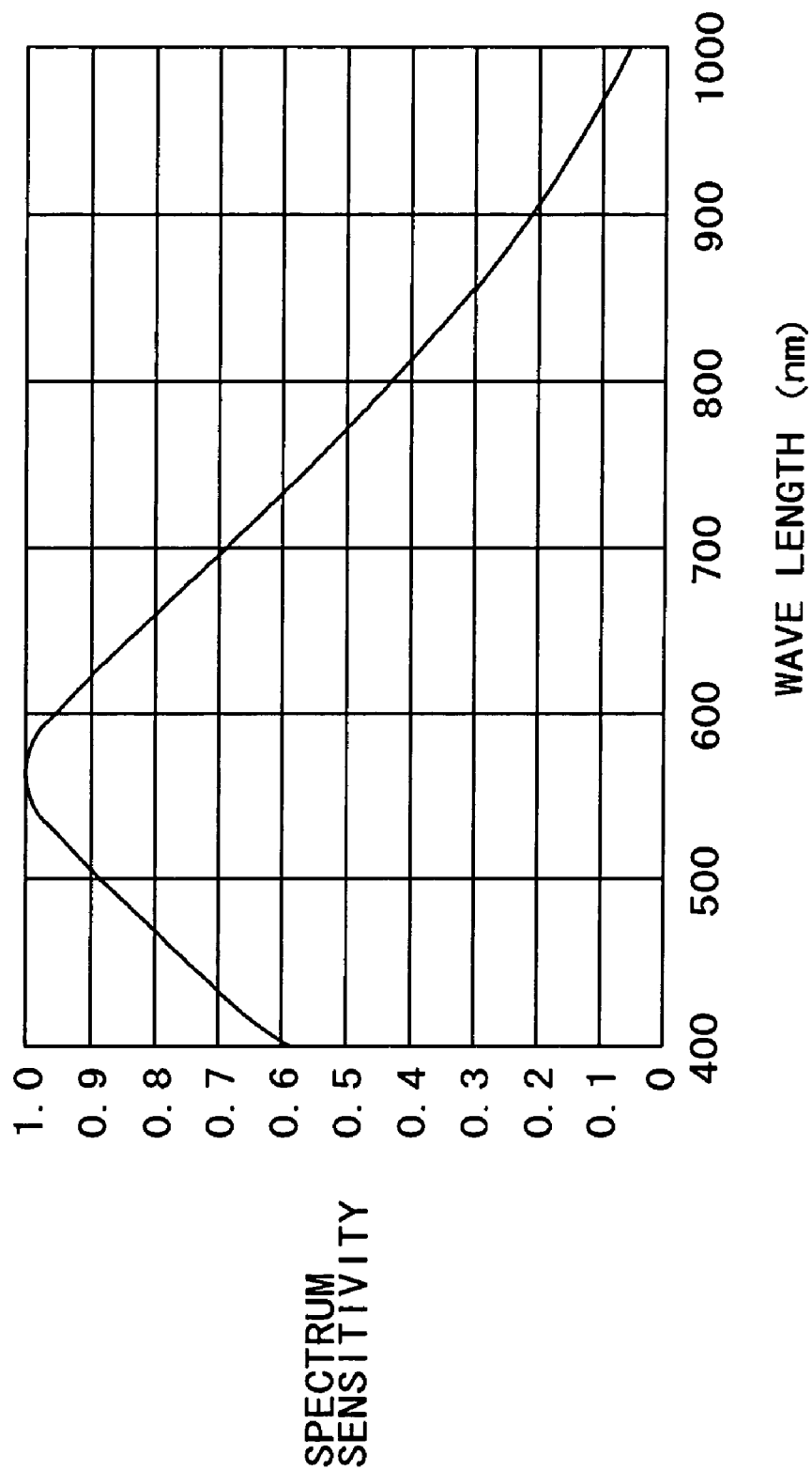
FIG. 3 is a diagram showing a video camera optical spectrum sensitivity curve.

The description next will be based on FIG. 2 and FIG. 3. FIG. 2 shows the optical spectrum sensitivity curve for the human eyes. FIG. 3 shows the optical spectrum sensitivity curve for the video camera. Specifically, FIG. 3 is a characteristic curve for the ICX259AL (manufactured by Sony). A similar type of characteristics curve has been presented in Section 3, Chapter 2 in a reference, "Light Detector and Method of Use" (Ryo Takamura, Norihito Suzuki, editor, Gakkai Shuppan Center, Tokyo, 1991).

As shown in FIG. 2, the optical spectrum sensitivity curve for the humans shows a maximum value at around 555 nm and shows reduced sensitivity at short wavelengths and long wavelengths in a bright field condition. Sensitivity is maximum at around 525 nm in a dark field condition. On the other hand, the optical spectrum sensitivity curve for the video camera in FIG. 3 does not completely match with the optical spectrum sensitivity curve for humans, although they are made similar to each other through an optical correction, using a color filter, and an electronic correction. This is because the sensitivity to the incoming light in an image capturing device (CCD: charge coupled device), which is used in the video camera, goes down more gradually compared with the human at the lower wavelengths and higher wavelengths.

In fact, while the human optical spectrum sensitivity is at almost 0 at 400 nm on a side of short wavelength or 700 nm at a side of long wavelength, the video camera's optical spectrum sensitivity is 0.6 at 400 nm on a side of the short wavelength and 0.7 at 700 nm on a side of the long wavelength, according to FIG. 2 and FIG. 3. Therefore, when the maximum value for the human optical spectrum sensitivity and the maximum value for the video camera optical sensitivity are approximately the same, the video camera's sensitivity for received light is in general be higher than the human's sensitivity for received light at a long wavelength and at a short wavelength. In other words, when a visible light of these wavelengths is used, an optical image for interference may be recorded distinguishably from the image being presented in an image that has been captured using an image capturing means, such as a video camera.

Accordingly, effects described next may be realized as a result of a radiation of a visible light for the interference that satisfies the conditions listed above. Firstly, the chromaticity of the visible light is similar to the image being presented, and the luminance is less than or equal to the contrast sensitivity increment threshold. As a result, the viewer cannot distinguish between the two. Even when the visible light for the interference is projected on a specific spot on the screen on which the image being presented is projected, the image at this projection spot may seem uniform, and an existence of the visible light for the interference may not be detected.

On the other hand, the video camera can record the light and shade of the contrast in the object being image captured, that may not be detectable to the human because of the differences in the optical spectrum sensitivities. Therefore, by radiating the visible light for the interference that satisfies the conditions listed above so as to overlap with the image being presented, it is possible to make the optical image of the visible light for the interference show up and be distinguishable in the captured image, when the image being presented is illegally captured. For example, a desirable marking that is unrelated to the image being presented may be recorded on the screen, if an optical image of an arbitrary shape were used as the visible light for the interference.

(A-2) Generating Optical System for the Visible Light

A generating optical system for the visible light that satisfies the conditions listed above will be described. As mentioned earlier, the chromaticity of the visible light for the interference is required to match the background chromaticity in the direction from which the light is emitted. The background chromaticity may correspond with the chromaticity of the image that is projected on the screen, as mentioned earlier, or may correspond with the chromaticity of the light arriving from an object that exists outside of the screen. In either of these cases, it is necessary to generate a visible light with a arbitrary luminance and chromaticity.

Figure 4:
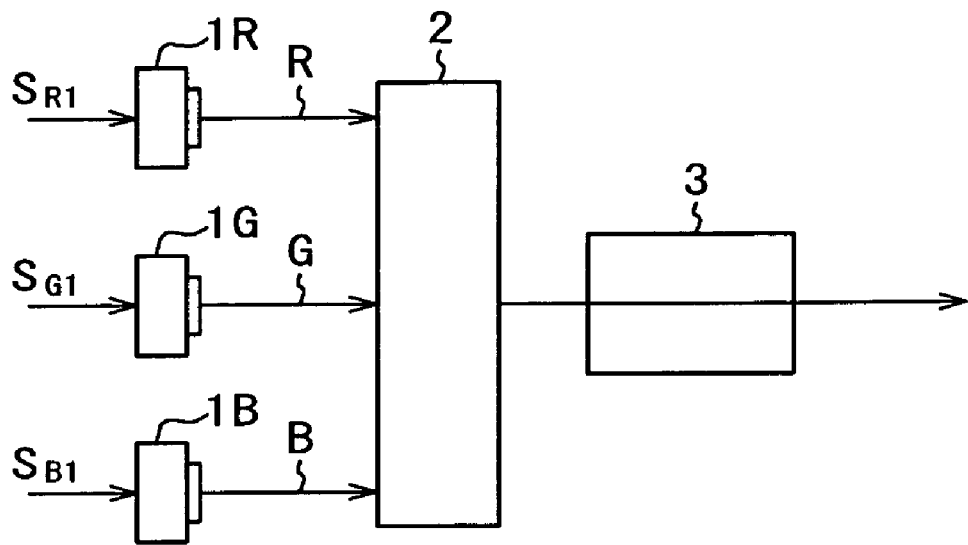
FIG. 4 is a diagram showing an example of a configuration of a visible light radiation apparatus (of a type that controls a volume of optical emission).
Figure 5:
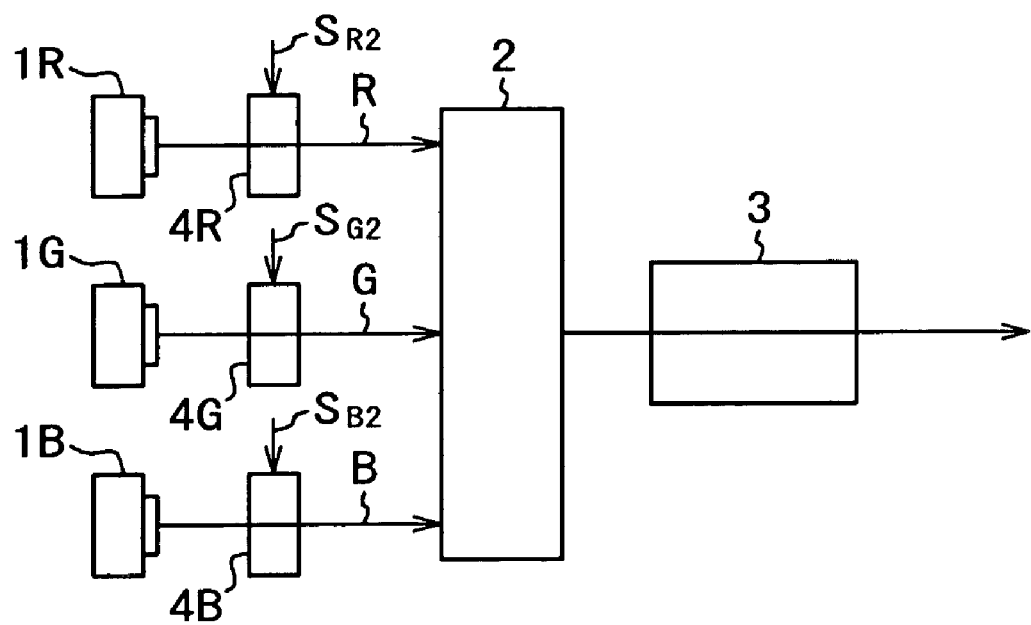
FIG. 5 is a diagram showing an example of a configuration of a visible light radiation apparatus (of a type that controls a transmitted volume).

Such a visible light can be generated by a visible light radiation apparatus having a configuration described next. For example, as shown in FIG. 4 and FIG. 5, a plurality of single color lights may be mixed for generating a visible light with an arbitrary luminance and chromaticity. The chromaticity can be expressed in relation to the XY plane coordinate, and the chromaticity of the visible light, resulting from color mixing, is a weighted average of each of the single colored lights, the weight of which is determined by the luminance. Therefore, by controlling the luminance of each of the single colored lights in the color mixture, a visible light of an arbitrary luminance and chromaticity may be generated on a line of spectrum that connects two points in the chromaticity coordinate, which correspond with the single colored lights in the mixture (two colors), or within an area bound by lines that connect points in the chromaticity coordinate, which correspond with the single colored lights in the mixture (three or more colors).

FIG. 4 shows an example of a configuration of a visible light radiation apparatus based on a method of controlling individually the volumes of light from three types of single colored light sources corresponding to a red color, a green color, and a blue color. In this figure, 1R refers to a single colored light source apparatus that emits a red colored light, 1G refers to a single colored light source apparatus that emits a green colored light, and 1B refers to a single colored light source apparatus that emits a blue light. Optical volume control signals SR1, SG1, and SB1, which are used for controlling the emission volume, are fed to each single colored light source apparatus, respectively. A light emitting diode (LED) or a laser (not limited to a solid state laser) may be used for the single colored light source apparatuses. 2 in the figure refers to a mixer optical system. As the mixer optical system 2, a dichroic mirror, a dichroic prism, an integrating sphere, or their combinations may be used.

In the figure, 3 refers to a projection optical system. The projection optical system 3 consists of projection lenses and other optical devices.

FIG. 5 shows an example of a configuration of a visible light radiation apparatus based on a method of controlling a volume of reflected or transmitted light and includes optical volume adjustable apparatuses in optical paths for the three types of single colored light sources, which correspond with the red light, the green light, and the blue light. In the figure, 1R, 1G, and 1B refer to single-light source apparatuses that emit the red light, the green light, and the blue light, respectively. In the system in FIG. 5, the volume of the single colored light emitted by each of the single colored light source apparatuses is fixed.

The optical volume adjustable apparatuses 4R, 4G and 4B, which are placed in the optical paths for the various single colored lights, which come into the mixer optical system 2, is characteristic of FIG. 5. Liquid crystal devices or neutral density filters (ND filters) may be used for the optical volume adjustable apparatus. When the liquid crystal device is used, the transmitted volume of light can be constantly adjusted with the optical volume control signals SR2, SG2, and SB2. When the neutral density filter is used, the rate of attenuation remains fixed for each device. In addition, as the volume of light in the optical volume adjustable apparatus, a means that controls the optical volume by mechanically adjusting an aperture size or a means that controls the optical volume by adjusting a time over which a shutter is kept open may be used.

While the three types of single colored light sources are set up independently in FIG. 4 and FIG. 5, they may also be stored within a single package. In other words, a full color optical source may be used. By the way, the visible lights radiating from the single colored light sources only need to be perceived by the viewer as a color mixture. Therefore, the configuration of the visible light radiation apparatus does not necessarily need to include the various optical systems mentioned above (dichroic mirror, dichroic prism, integration sphere, projection optical system).

(A-3) An Example of a Layout of the Visible Light Radiation Apparatus

A layout that may be used for the visible light radiation apparatus will be described next. An example of the layout that will be described next may be used for both an image projected from a front side of the screen, as shown in FIG. 6, and an image projected from behind a semi-transparent screen, as shown in FIG. 7.

Figure 6:
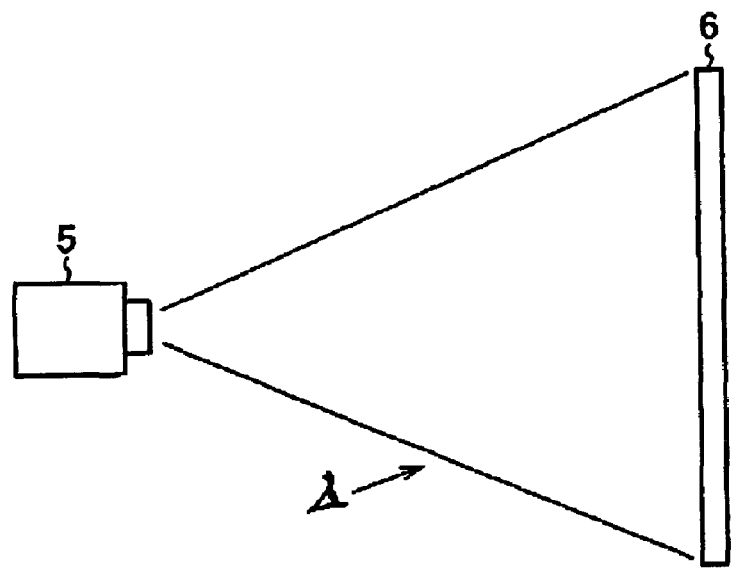
FIG. 6 is a diagram showing an example of a layout for a projection apparatus (of a front projection type).
Figure 7:
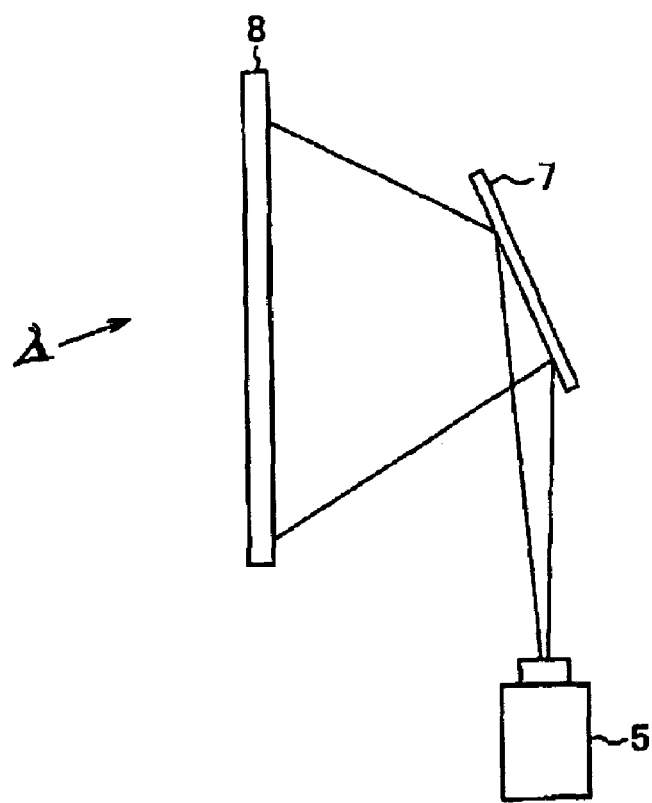
FIG. 7 is a diagram showing an example of a layout for a projection apparatus (of a rear projection type).

The method of placing the projection apparatus 5 in front of the screen 6, as shown in FIG. 6, for viewing a reflected optical image will be called a front projection method. The method of placing the projection apparatus 5 behind the semi-transparent screen 8, as shown in FIG. 7, for viewing the transmitted optical image will be called a rear projection method. By the way, a reference numeral 7 represents a reflective mirror that bends an optical path of a beam of light radiating from the projection apparatus 5 in FIG. 7.

Figure 8:
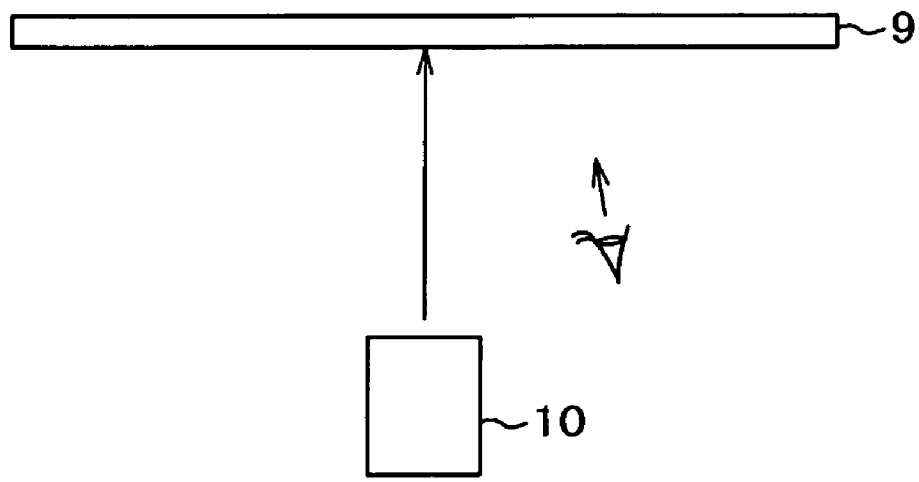
FIG. 8 is a diagram showing an example of a layout for a visible light radiation apparatus (of a front projection type).

Coming back to the description of the visible light radiation apparatus, the visible light radiation apparatus may be placed at the following locations. For example, as shown in FIG. 8, the visible light radiation apparatus 10 may be placed in front of the screen 9, in order to interfere against the illegal activity using a reflected light, that radiates toward the audience.

Figure 9:
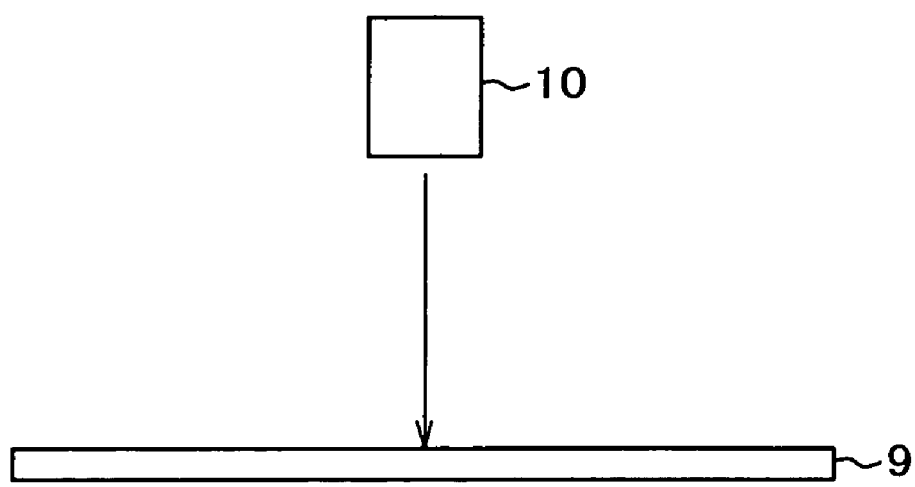
FIG. 9 is a diagram showing an example of a layout for a visible light radiation apparatus (of a rear projection type).

As shown in FIG. 9, the visible light radiation apparatus 10 may also be placed behind the screen 9 in order to interfere against the illegal activity using an optical beam, that transmits through or passes through the screen. If the light, that transmits through the screen, were to be used, the chromaticity of the transmitted light is required to match the chromaticity of the image being presented, as detected by the viewer.

Figure 10:
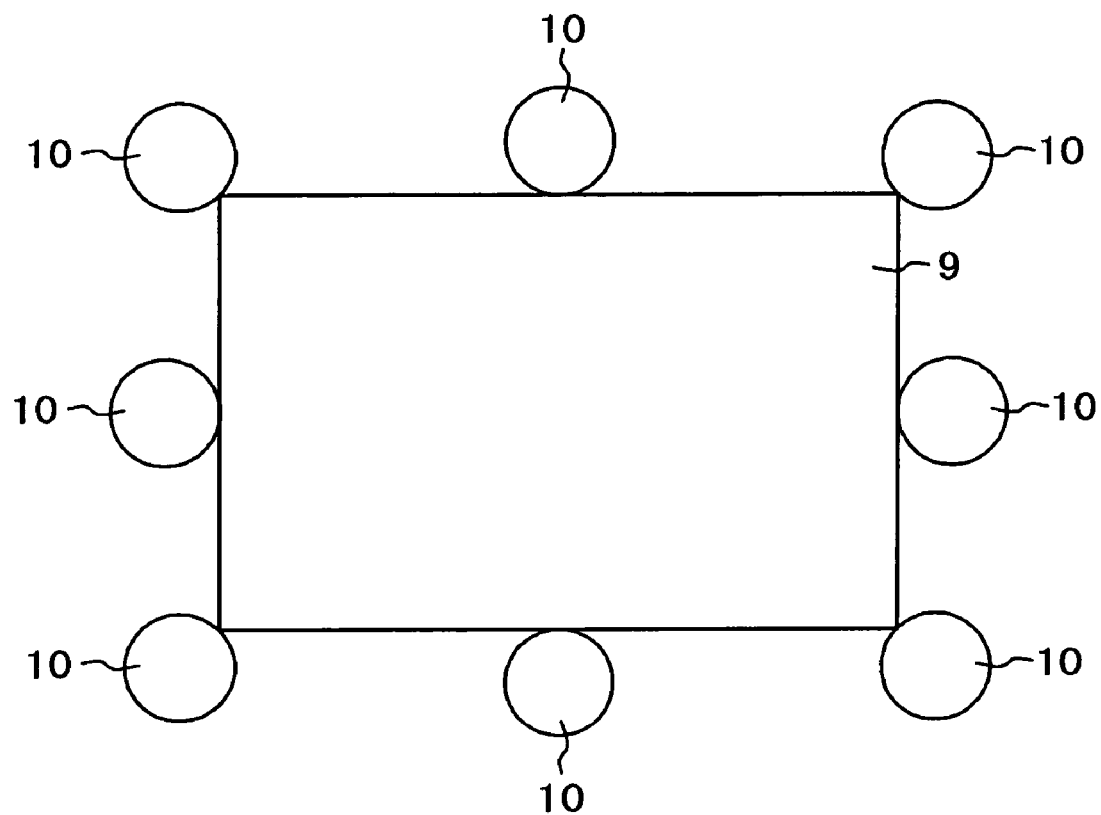
FIG. 10 is a diagram showing an example of a layout for a visible light radiation apparatus (of a peripheral radiation type).

Or, as shown in FIG. 10, the visible light radiation apparatus 10 may be placed at the peripheral of the screen 9, in order to radiate the visible light for the interference directly into the image capturing apparatus used by the perpetrator of the illegal activity. Although a plurality of the visible light radiation apparatus units is shown in FIG. 10, it is also possible to only use one unit at one of the locations. In this layout example, however, the position of the visible light radiation apparatus is not limited to the screen periphery and, instead, can be behind the screen or in front of the screen. In essence, the layout example in FIG. 10 represents the visible light, that is used for the interference, being projected toward the viewer through a space outside of the screen. The viewer sees the incoming visible light for the interference directly.

Figure 11:
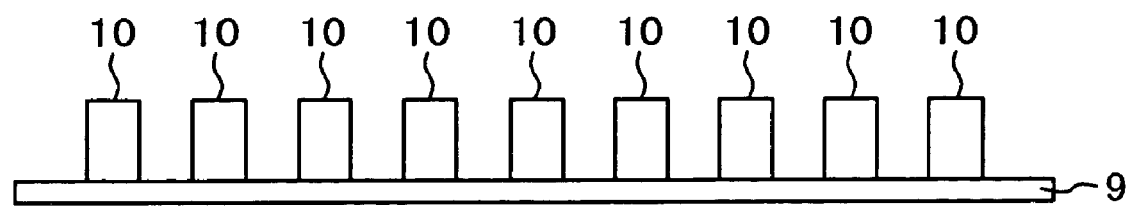
FIG. 11 is a diagram showing an example of a layout for a visible light radiation apparatus (of a back surface output type).

Or, as shown in FIG. 11, the visible light radiation apparatus 10 may be placed on the back side of the screen 9, in order to use the optical beam, that passes through or transmits through the screen, in order to interfere against the illegal activity. When the light transmitting through the screen is used, the chromaticity of the transmitted light is required to match the chromaticity of the image being presented as detected by the viewer. The visible light radiation apparatus may be placed over the screen or near the screen. In FIG. 11, the visible light radiation apparatus is placed above the screen. By the way, a part of or the entire visible light radiation apparatus may be embedded inside the screen. In such an instance, an aperture, from which the visible light radiates, may be exposed at the surface of the screen or be embedded inside a screen.

Although a single unit of the visible light radiation apparatus is shown in each of FIG. 8 and FIG. 9, a plurality of the visible light radiation apparatus units may also be placed in all of these cases. While the visible light radiation apparatus shown in these figures basically radiates light in only one direction, the direction of radiation may be made variable in order to radiate the visible light in a plurality of directions.

(A-4) Method of Synchronizing the Luminance and Chromaticity With the Image Being Presented A method of synchronizing the visible light, that is used for the interference, with the image being presented will be described next. In other words, a method of variably controlling the luminance and chromaticity of the visible light used for the interference, in response to the image being presented, will be described. If the visible light for the interference passes through a space outside of the screen, then the method may be used in a system for synchronizing the chromaticity and luminance of the visible light, which is used for the interference, with a background light.

Figure 12:
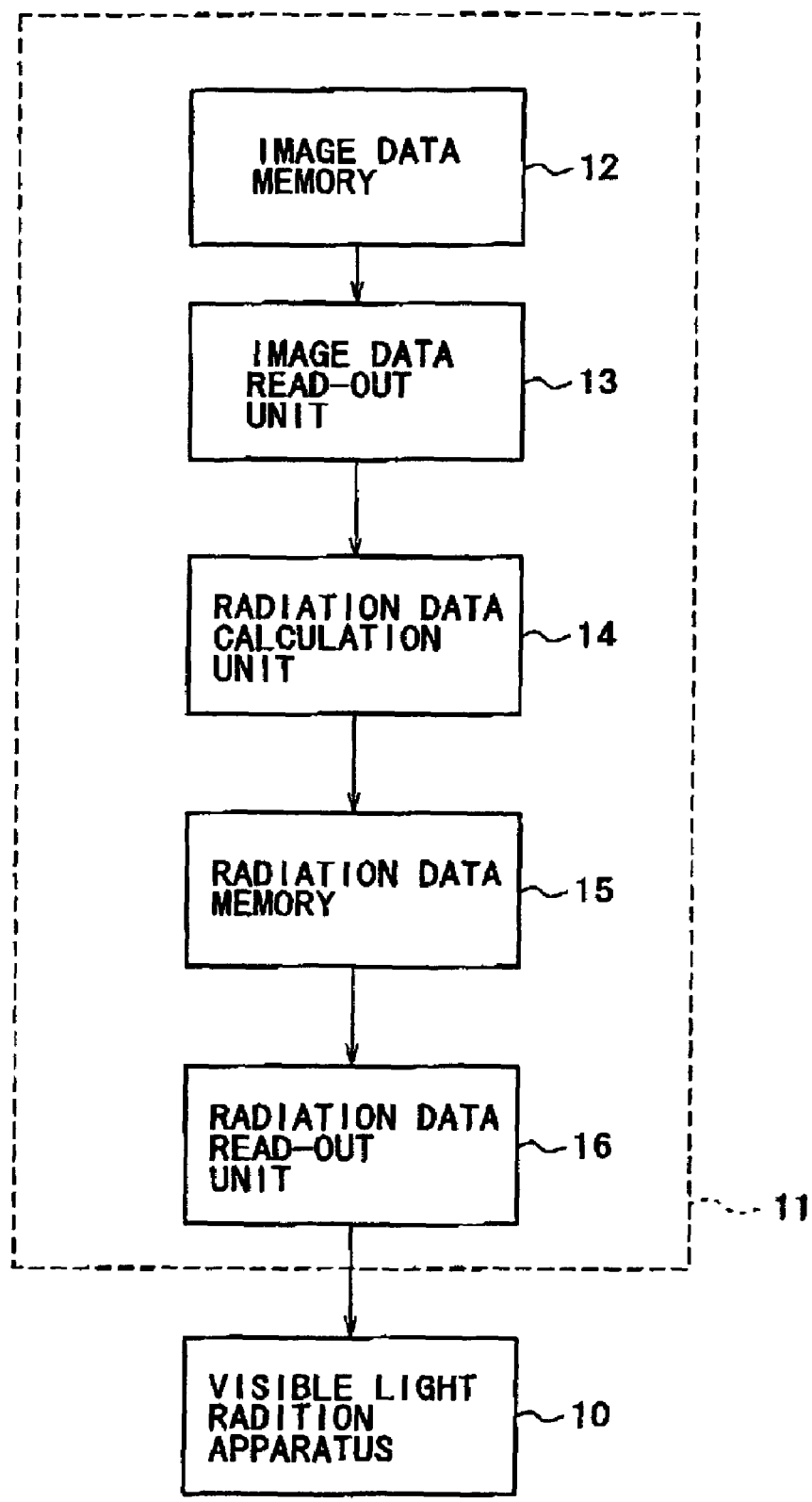
FIG. 12 is a diagram showing an example of a configuration of a synchronizing apparatus (of a real time type).
Figure 13:
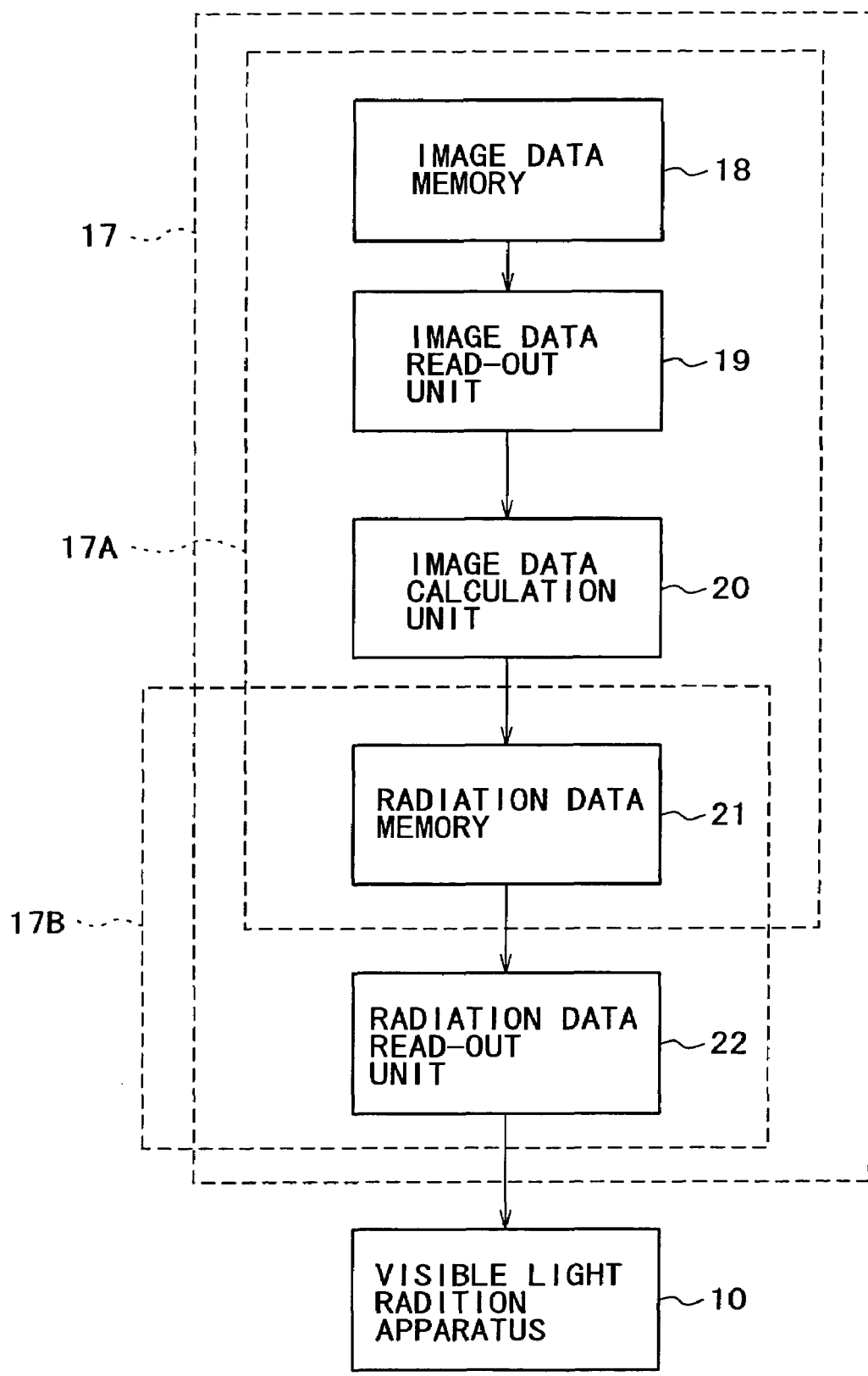
FIG. 13 is a diagram showing an example of a configuration of a synchronizing apparatus (of a storage type).

The image being presented and the visible light radiation apparatus may be synchronized, for example, using the following methods. The visible light radiation apparatus may be controlled based on information calculated in real time. Or, the visible light radiation apparatus may be controlled using information calculated in advance. The former method is used for projecting the image being presented using a digital type projection apparatus. The latter method is used for projecting the image being presented using a film based projection apparatus. FIG. 12 and FIG. 13 show examples of the systems corresponding to each method.

(1) First System Example

FIG. 12 shows an example of a configuration of a synchronizing apparatus 11 when a digital type projection apparatus is used. The synchronizing apparatus 11 includes an image data memory 12, an image data read-out unit 13, a radiation data calculation unit 14, a radiation data memory 15, and a radiation data read-out unit 16.

The image data memory 12 records the image data for the main feature program presentation. The image data memory 12, however, does not need to store the entire image data for the entire screen and may, instead, the store image data related to positions at which the visible light for the interference will be superimposed. The image data read-out unit 13 reads out a frame number for the image data or a comparable data number from the image data memory 12. By the way, the image data read-out unit 13 needs to read out the image data only when the visible light for the interference is radiating. For example, the reading may take place once every few frames or when the scene changes. The unit of reading may be a single frame or a plurality of frames.

The radiation data calculation unit 14 calculates the chromaticity and luminance of the image data for each frame number (and for each position of superimposition, when the visible light for the interference is superimposed at a plurality of locations within a single frame). In general, the image data for the presentation consists of primary color data for red, green, and blue. Therefore, the radiation data calculation unit 14 uses directly the chromaticity data, in the image data for the presentation, for the chromaticity data for the visible light for the interference. On the other hand, the luminance data needs to be below the human contrast sensitivity increment threshold. The radiation data calculation unit 14 calculates the appropriate luminance values using, for example, the equation (1) described earlier. These calculation processes take place before the applicable image is projected onto the screen.

The radiation data memory 15 temporarily stores the radiation data calculated by the radiation data calculation unit 14. In other words, the radiation data memory 15 functions as a buffer for storing the calculated radiation data until the radiation data is read out.

The radiation data read-out unit 16 reads the radiation data, which corresponds with the frame number, or a data number, that is assigned to the image being presented that is to be projected, from the radiation data memory 15. The frame number or the corresponding data number, that is assigned to the image being presented, is provided by the projection apparatus that projects the image being presented.

While the description here is based on the visible light radiation apparatus, which radiates the visible light for the interference, being a separate unit from the projection apparatus, that projects the image being presented, the two units may also make up a single unit.

By the way, the luminance of the image being presented may be adjusted down by an amount calculated for the luminance of the visible light for the interference, in this instance. In the case of a single unit, an optical system and other parts are used for both the interference optical system and the image presentation optical system, and a misalignment and a chromaticity mismatch, which may be caused by differences in optical characteristics, may no longer be an issue. Of course, optical systems having equivalent characteristics may be used for the interference optical system and for the presentation optical system, when the two apparatuses are separately provided.

(2) Second System Example

A system example in FIG. 13 will be described next. FIG. 13 shows an example of configuration for a synchronizing apparatus 17, which is used for a film based projection apparatus. The synchronizing apparatus 17 includes a preprocessing unit 17A and a real time processing unit 17B. The preprocessing unit 17A corresponds with the image data memory 12 through the radiation data memory 15 in FIG. 12. In other words, the preprocessing unit 17A includes an image data memory 18, an image data read-out unit 19, a radiation data calculation unit 20, and a radiation data memory 21.

The image data memory 18 stores data collected in advance using, for example, a spectrum radiance luminance meter on the image being presented, which is projected onto the screen during, for example, a test screening. Of course, the image data memory 18 does not need to store the image data for the entire screen and, instead, may store only the image data corresponding with the positions at which the visible light for the interference is to be superimposed. The image data read-out unit 19 reads out a frame number for the image data, or a corresponding data number, from the image data memory 18. The image data read-out unit 19 needs to read out the image data only when the visible light for the interference is to be radiated. For example, the readout may take place once every few frames or when the scene changes. The unit of readout may be a single frame or a plurality of frames.

The radiation data calculation unit 20 calculates the chromaticity and luminance of the image data for each frame number (or for each position of superimposition, when the visible light for the interference is to be superimposed at a plurality of locations in a single frame). In general, the image data for the presentation consists of primary color data of red, green and blue. Therefore, the radiation data calculation unit 20 uses the chromaticity data for the image being presented directly for the chromaticity data for the visible light for the interference. On the other hand, the luminance data is required to be equal or less than the human contrast sensitivity increment threshold. The radiation data calculation unit 20 calculates the applicable luminance values using, for example, the equation (1) described earlier. The calculation process takes place before the corresponding image is projected onto the screen.

The radiation data memory 21 temporarily stores the radiation data calculated by the radiation data calculation unit 20. In other words, the radiation data memory 21 functions as a memory apparatus for storing the calculated radiation data until a time the image is projected on the screen. The memory apparatus may be based on a magnetic recording medium, an optical recording medium, an opto-magnetic recording medium, or a semiconductor memory.

By the way, the processing contents of the preprocessing unit may be executed by a server apparatus which is connected by a network, and downloaded before or during the projection of the image being presented. In such an instance, a communications apparatus for downloading and a memory apparatus for storing data that has been downloaded are required at each projection position, which functions as a client.

The real time processing unit 17B includes a radiation data memory 21 and a radiation data read-out unit 22. The radiation data read-out unit 22 reads the radiation data, corresponding to the frame number assigned to the image in the presentation, that is to be projected, or the corresponding data number from the radiation data memory 21. By the way, the frame number assigned to the image being presented or the corresponding data number is provided by the projection apparatus that projects the image being presented.

(A-5) Experimental Results

An example of a assumed system for the embodiment will be described first. When the image being presented is projected using a projector, a white color light source, such as a halogen lamp or a metal hydride lamp, will be used as an optical source. The image being presented is shown on a screen, as a beam of light radiates from the source of white color light, passes through a color filter, and is projected using an optical system. In the present invention, the visible light, that satisfies the conditions described earlier, is projected onto specific areas of the image being projected. In other words, the visible light, having the same chromaticity as the image being presented and a luminance level that is approximately the same or below the human contrast sensitivity increment threshold, which is obtained based on the image being presented, is projected onto the screen.

Figure 14:
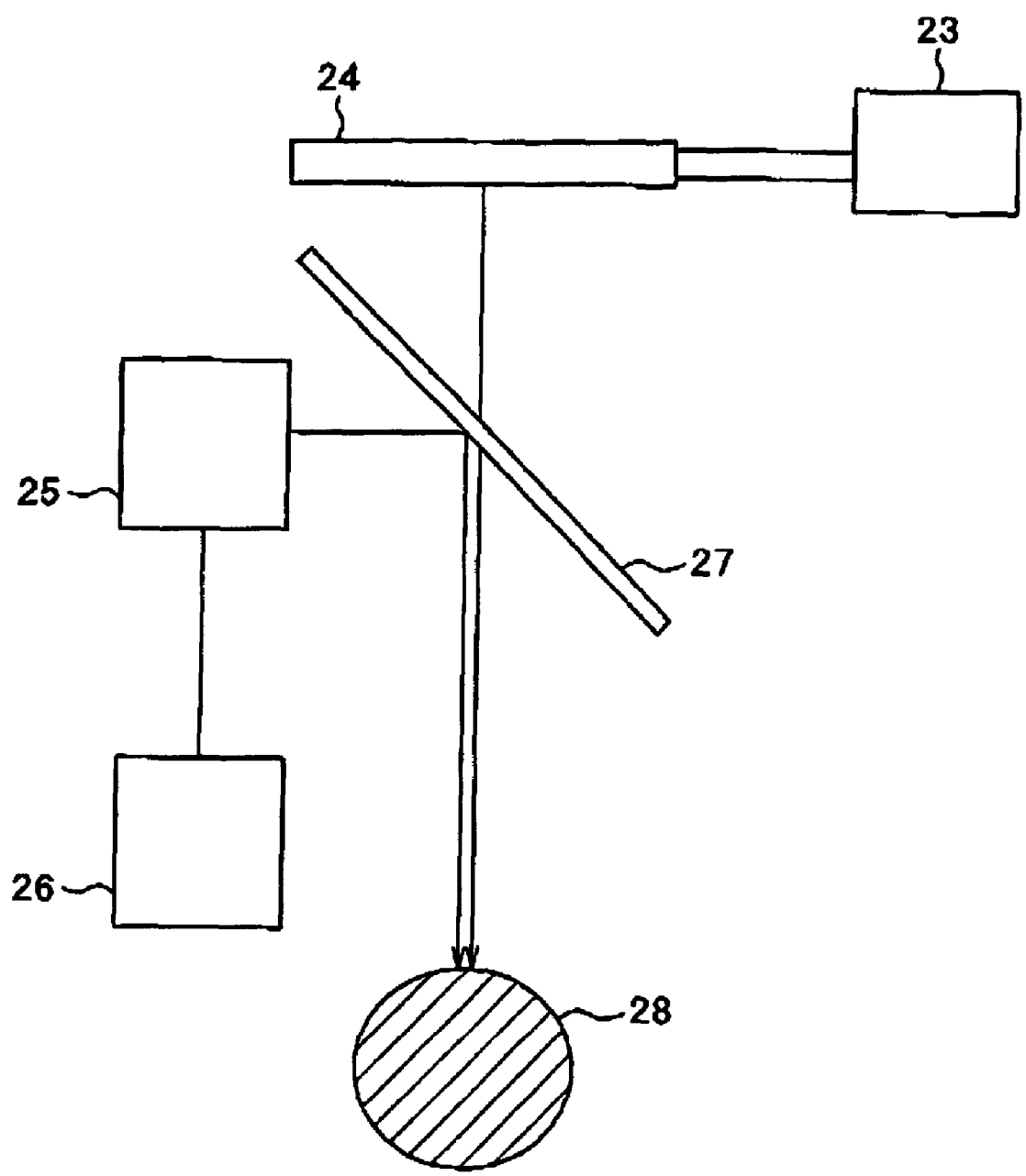
FIG. 14 is a diagram showing an example of a configuration of an experimental system.

Assuming such an embodiment, the inventors of the present invention have verified an effectiveness of the present invention using an experimental system shown in FIG. 14. A halogen light source 23, which is connected to a surface emission light guide 24, is used as a source of white color light in this experimental system. The halogen light source 23 being used is manufactured by Mejiro Precision and consumes 100W of electrical power. The surface emission light guide 24 is the MPP90-1500S, which is manufactured by Moritechs, and has a 90 mm square emission surface.

On the other hand, the visible light radiation apparatus, that radiates the visible light for the interference, includes an integration sphere 25, which includes three types of single colored light sources and is driven by an arbitrary waveform generator 26. A red color LED is the HLMPD 105, which is manufactured by Hewlett Packard. A green color LED is the NSPG 500S, which is manufactured by Nichia Chemical. A blue color LED is the NSPB 500S, which is manufactured by Nichia Chemical. The arbitrary waveform generator 26 is the AWG 2005, which is manufactured by Sony Tectronix.

As a composition means 27 for the visible light, which is emitted by the two parts, a plate beam splitter (half mirror) is used. An apparatus mentioned below is placed in an area 28 as an apparatus for verifying how the visible light, after the composition, is image captured. A luminance meter (BM-5A, manufactured by Topcon) is placed for measuring the chromaticity and luminance. The CCD-MC100, which is manufactured by Sony, is used as a video camera for image capturing. The GV-D900, which is manufactured by Sony, is used as a video deck that includes a display unit for verifying the images being recorded.

Measurement results were as follows. Firstly, a measurement was taken only for the visible light radiating from the surface emission light guide, and the result for the xy chromaticity was (x, y, L (luminance, cdm $^-2$))=(0.448, 0.419, 40.2), which may correspond with an image that was projected using the white color light source.

Next, a visible light, which is 10 mm square in size and radiating from the integration sphere, is superimposed on the image, and measurements were taken at the area of overlap. The volume of light from the integration sphere is adjusted, so that the measurement taken at the area of overlap may be (x, y, L)=(0.448, 0.419, 41.0). In other words, the chromaticity in the area of overlap with the visible light from the surface emission light guide is made to match the area with only the visible light from the surface emission light guide, while the luminance is increased only by the increment threshold, by adjusting the volume of light from the integration sphere.

An observer observing the result was not able to distinguish between the area, with only the visible light from the surface emission light guide, and the area of overlap, with the visible light from the integration sphere and this visible light. On the other hand, an image, that has been captured using a video camera and shown on a display, showed a contrast difference between the two. In other words, it was verified that a person may not be able to make a distinction, but the visible light for the interference may be recorded in the image captured illegally using the video camera.

(B) Conceptual Embodiment

Next, a conceptual embodiment that will be applicable to the various embodiments based on the visible light, that satisfies the Condition 1 and the Condition 2, will be described.

(1) A method is proposed for interfering against illegal activities by radiating a visible light for the interference from a viewer's side toward a screen and using a reflected light from the screen surface. In this instance, the visible light for the interference is projected from the front of the screen toward the screen. This embodiment corresponds with FIG. 8. The visible light radiation apparatus does not need to directly face the screen, as long as the position is in front of the screen. For example, the visible light radiation apparatus may be placed in front of the screen at an angle. In such an instance, the visible light radiation apparatus may be placed near the periphery of the screen, so that the visible light may be radiated almost in parallel with the screen. Of course, the distance between the screen and the visible light radiation apparatus may be small or large. Furthermore, a means of reflection (for example, a mirror) may be installed for projecting the visible light, reflecting off the means of reflection, as the visible light for the interference onto the screen.

By the way, the projection apparatus, that projects the image being presented, may be placed in front of the screen, as shown in FIG. 6, or may be placed in a position behind the screen, as shown in FIG. 7.

(2) A method is proposed in which a visible light for the interference is radiated from behind the screen onto the screen, and a light transmitting through the screen and reaching the viewer is used for interfering against an illegal activity. In other words, the visible light for the interference, which is projected from behind the screen toward the screen surface, transmits through the screen toward the front side of the screen in the proposed method. This scheme corresponds with FIG. 9. As long as the visible light radiation apparatus is in the back side of the screen, the apparatus may be positioned in such a way as to not directly face the screen. For example, the visible light radiation apparatus may be placed at an angle in front of the screen. Or, a means of reflection (for example, a mirror) may be set up, and the visible light reflecting off this means of reflection may be used as a light for the interference and projected onto the screen.

By the way, the following transmission paths are possible for the visible light for the interference, based on the structure of the screen. For example, when a part of the screen is thinner than other areas on the screen (for example, the screen has a concave shape), then the transmission may take place in this particular area. Or, if a material that may easily allow the visible light to transmit through is embedded into a part of the screen in order to allow the visible light for the interference to transmit through, then the visible light may transmit through this material. If the entire screen is made of a material that may easily allow the visible light to transmit through, then the visible light may transmit through any part of the screen.

In these instances, the projection apparatus, that projects the image being presented, may be placed in front of the screen, as shown in FIG. 6, or behind the screen, as shown in FIG. 7.

(3) A method is proposed, in which a visible light for the interference is radiated onto a screen from behind the screen, and a passing light, that passes through an part for passing in the screen, is emitted toward the viewer in order to interfere against an illegal activity. In other words, the visible light for the interference is projected from a position behind the screen toward the screen surface and passes through the screen and travels toward the front of the screen in the method being proposed. This scheme corresponds with FIG. 9. Except that the visible light for the interference passes through the screen, the scheme is similar to the one described in (2).

Figure 15:
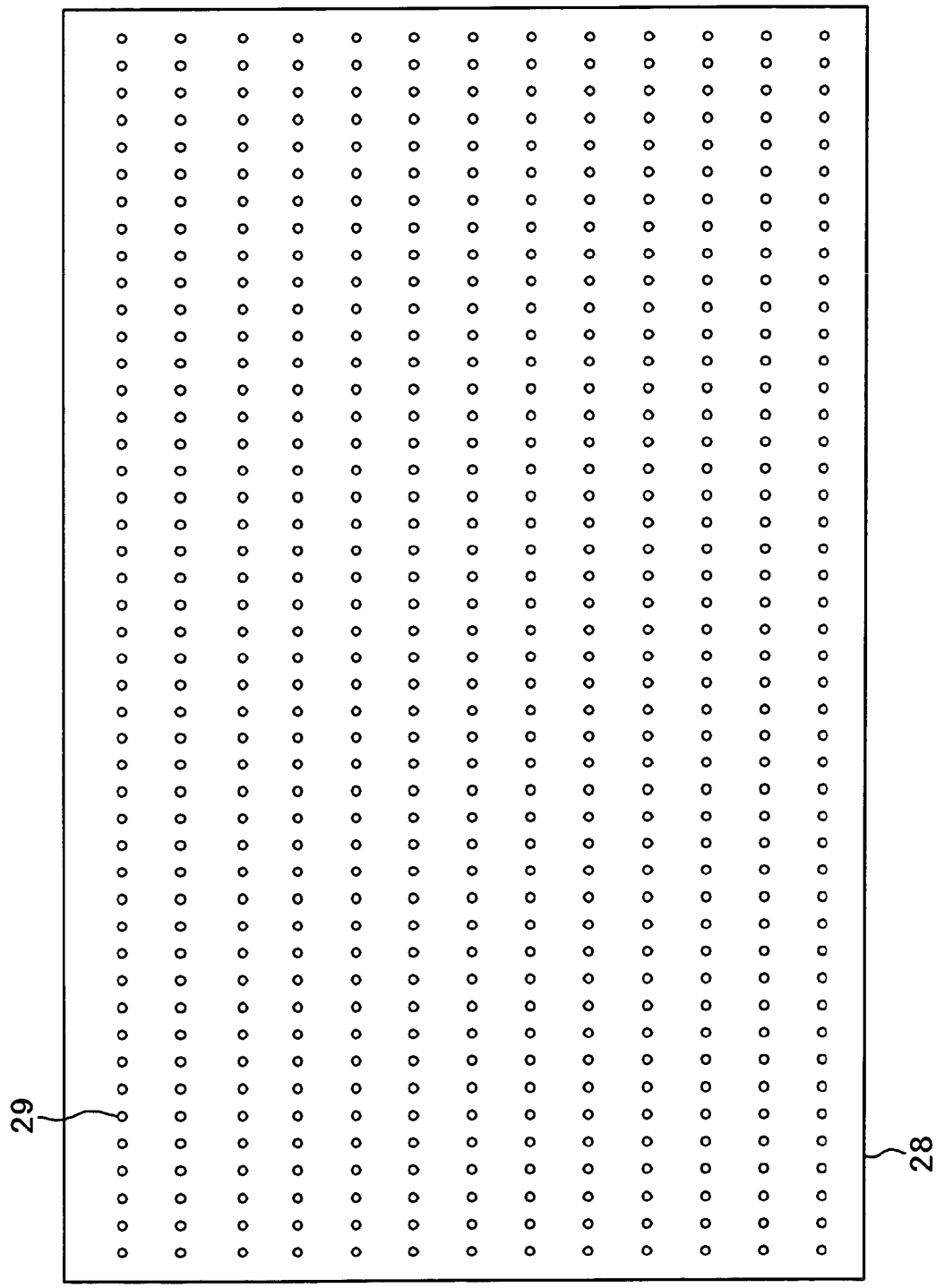
FIG. 15 is a diagram showing an example of a screen configuration.

This part for passing may be a break or a gap (for example, a slit), that extends in one direction; a hole portion that penetrates through the screen (for example, a small hole or a hole); or other structures that may allow the visible light to pass through from the back side to the front side of the screen. There should be at least one passing part created on the screen. If there is a plurality of passing parts, then the location for passing may be made selectively variable. Furthermore, the passing part may be laid out across the entire screen or may be concentrated at a specific area (for example, at the center of the screen or at the periphery of the screen). An example is shown in FIG. 15. FIG. 15 shows the passing parts 30, that are laid out across an entire surface of a screen 29.

(4) A method is proposed in which a visible light for the interference is reflected off a means of reflection, and a reflected light is radiated onto the screen. As explained in (2) and (3), the visible light for the interference, that is projected onto the screen, is not limited to those directly projected from a visible light radiation apparatus. When a means of reflection, such as a mirror is used instead, a higher degree of freedom is allowed with the position for installing the visible light radiation apparatus.

The means of reflection or its reflection surface may be capable of arbitrary changing the direction of reflection by a means of driving. Even when the visible light for the interference is projected to a plurality of areas, the visible light radiation apparatus may not need to be installed for all of such areas, when the means of driving is utilized. In other words, an interference over a wider range is made possible. Furthermore, the means of driving may be used as a means of adjustment for precisely targeting the position of the visible light for the interference on to a target pixel.

By the way, the present embodiment may be used for both the visible light for the interference radiating from the front of the screen or for the visible light for the interference radiating from behind the screen. Of course, the position of the projection apparatus, which projects the image being presented onto the screen, may not be limited to any particular position.

Figure 16:
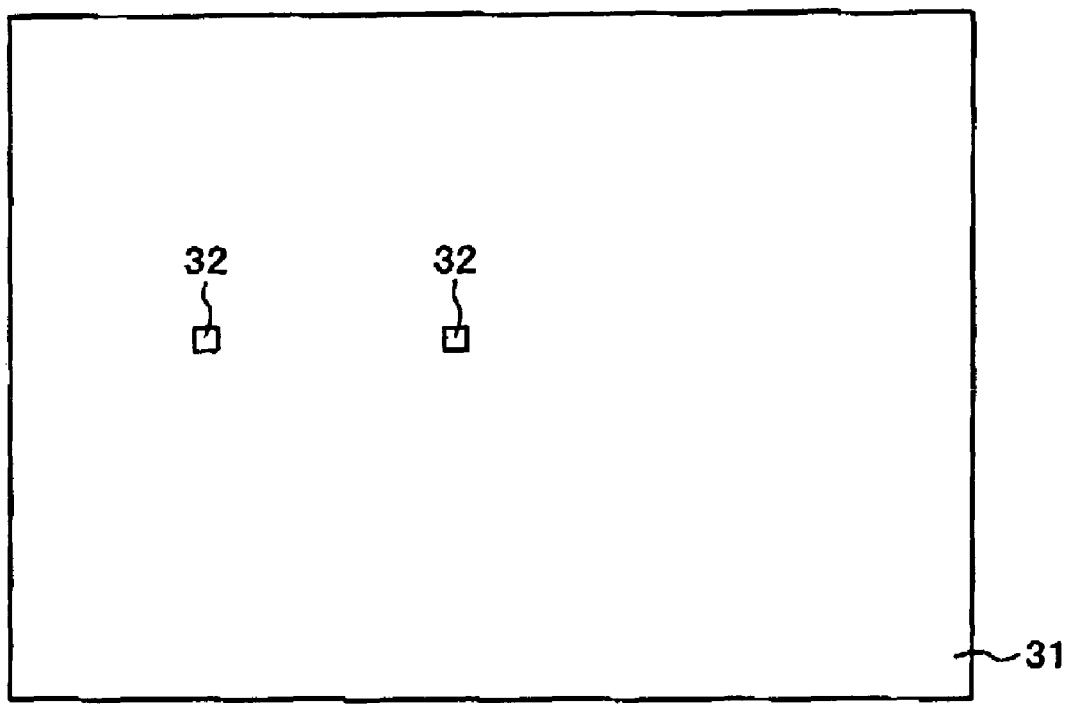
FIG. 16 is a diagram showing an example of optical image patterns (1).
Figure 17:
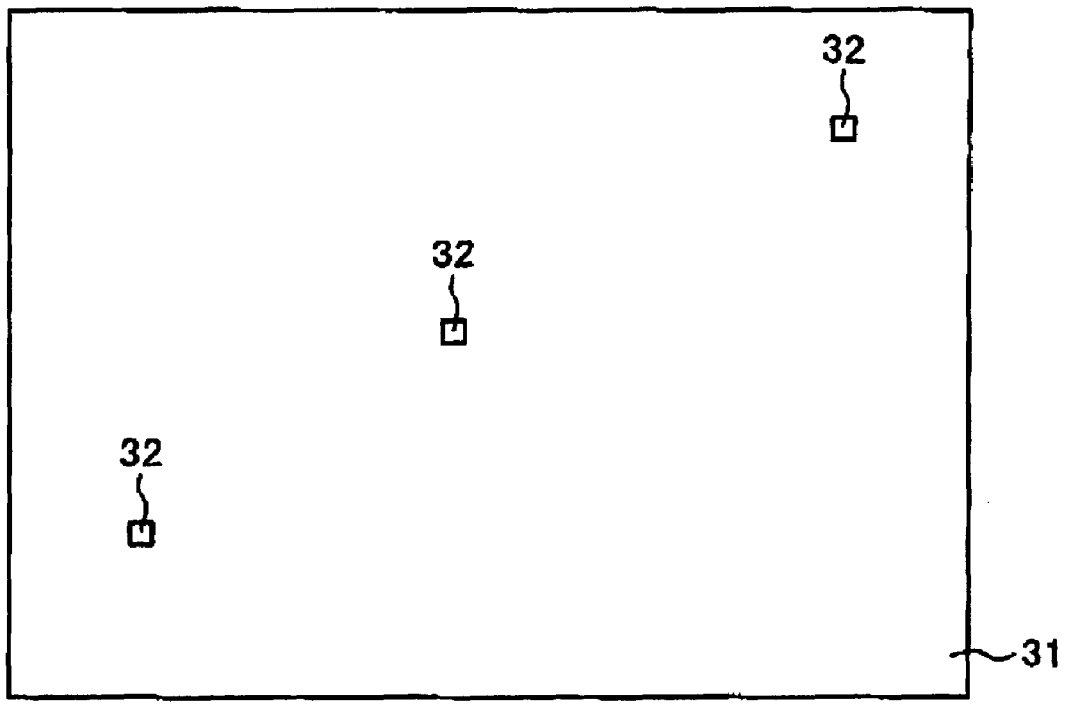
FIG. 17 is a diagram showing an example of optical image patterns (2).

(5) A method is proposed in which visible lights for the interference in prescribed combinations are radiated onto a plurality of spots on a screen, so that a two dimensional optical image pattern may be simultaneously recorded with an image on a screen that is illegally captured. In the present embodiment, optical images, such as those shown in FIG. 16 or FIG. 17, may appear in the recorded image display, when the image is captured illegally. FIG. 16 shows an optical image pattern consisting of two pieces of optical points 32 on a recorded image display 31, while FIG. 17 shows an optical image pattern consisting of three pieces of optical points 32 on the recorded image display 31.

With this method, desirable information may be displayed based on the positions of the optical points and the number of optical points displayed simultaneously. For example, the desirable information may include an output time and date, an output location, a screen number (a unique number that identifies the screen), an output apparatus number (a unique number that identifies the output apparatus), and other information required for identifying a party involved in the output, as well as a location of the illegal activity. Any piece of information or a plurality of pieces of information may be represented using binary optical point image patterns.

If the shapes of the point image were variable, then even more information could be displayed. Instead of assigning meanings to the recorded positions of the optical points or the number of optical images displayed simultaneously, a meaning may also be assigned to a two dimensional shape (a geometric shape, a symbol, and other recognizable patterns), that is presented by the entire point image.

The optical image pattern may remain the same throughout the screening of the image being presented or may be changed periodically or irregularly. Furthermore, the optical image pattern may be projected throughout the entire screening of the presentation or may be projected intermittently.

Of course, the visible light radiation apparatus may be placed in front of the screen or behind the screen in the present embodiment. Furthermore, the projection apparatus for projecting the image being presented may be placed in front of the screen or behind the screen. The visible light for the interference, which is radiated onto the screen, may be reflected off a means of reflection.

If an objective is to make it difficult to view the captured image, then the visible light for the interference should be radiated in such a way that a large number of optical images may be recorded. Or, the projection positions (lighting positions) of the visible light may be changed in a desired manner.

(6) A method is proposed in which, when an image being presented is projected onto a screen by a means of film based projection, a white color light for the interference, a luminance of a target image pixel of which is determined based on an average luminance between a preceding shot and an ensuing shot, is radiated onto the target image pixel on the screen during a time period in which the projected light is shuttered by a frame forwarding shutter. This method is used particularly for black and white images, which are projected using a film based projector apparatus. The present method is characterized in that an emission period for the white color light (the visible light) for the interference is limited to periods in which the frame forwarding shutter is closed.

By the way, the length of time during which the frame forwarding shutter shutters the projection light may be detected or predicted based on a frame forwarding operation or directly detected or predicted based on the operation of the frame forwarding shutter.

Of course, no additional restrictions are imposed other than the requirement on the timing of projection for the white color light for the interference. The white color light for the interference may be projected from the front side of the screen or projected from the back side of the screen. Furthermore, the image being presented may be projected from the front side of the screen or projected from the back side of the screen. By the way, the white color light for the interference only needs to be radiated during some of the time periods in which the frame forwarding shutter is closed and not during all of the time periods. Furthermore, the white color light for the interference may be radiated during the time periods in which the image being presented is shown in a way similar to the other examples.

(7) A method is proposed in which a visible light for the interference, a luminance and chromaticity of a target image pixel of which is determined based on an average luminance and an average chromaticity between a preceding frame and an ensuing frame, is radiated on the target image pixel during a time in which a frame forwarding shutter shutters a projection light, when an image being presented is projected onto a screen using a film based means of projection. This method is used in particular for the images being presented that are in colors. Other aspects are similar to the method in (6).

(8) A method is proposed in which a direction of radiation of the above-mentioned visible light for the interference is adjusted automatically, when a screen size (or aspect ratio) is changed. When the screen size is changed, the image pixel, onto which the visible light for the interference should be projected, moves physically. Consequently, the position from which the visible light for the interference is projected is required to be adjusted. However, this process is extremely burdensome to execute manually. On the other hand, an operator may only need to take into account the screen size, when performing the task, if an automatic adjustment feature were loaded. Efficiency may be significantly improved.

(9) A method is proposed in which a visible light for the interference passes through a space outside of a screen and is directly radiated on the viewer. In this instance, the visible light for the interference is reflected off or radiated from an object other than the screen and is superimposed with a background light. It goes without saying that, even in such an instance, the visible light for the interference may remain undetectable to a human, as long as the chromaticity and the luminance satisfy the condition 1 and the condition 2, which were described earlier, with respect to the background light.

(10) A method is proposed in which a visible light for the interference is radiated from an optical source behind a screen surface and transmits through the screen to the audience. This method represents a special form of the method described in (2). In other words, the visible light for the interference is radiated from a position that is close to the screen back side or adjacent to the screen back side. The point of emission for the visible light for the interference may be adjacent to the screen back side or may face the screen with a small gap in between.

The path of transmittance may be similar to the example described in (2). This method may be applied on the image presented with a projection from the front of the screen or with a projection from the back of the screen.

(11) A method is proposed in which a visible light for the interference is emitted from an optical source on a back side of the screen and passes through a passing part in the screen and reaches the viewer directly. This method is a special form of the method described in (3). In other words, the visible light for the interference is emitted from a position that is close to the back side of the screen. In this instance also, the point of emission of the visible light for the interference may be adjacent to the screen back side or may face the screen backside with a small gap in between.

The screen used in this instance is similar to the one described in (3). This method may be applied for the image being presented that is projected from the front of the screen or from the back of the screen.

(12) A method is proposed in which a visible light for the interference is emitted out of an optical source, that is embedded in a screen, and emitted directly to the audience from the screen surface. The embedded optical source may be detachable from the screen or may comprise a single unit with the screen. The point of emission in the embedded optical source may be buried within the screen or may be exposed at the surface of the screen. By the way, when the point of emission in the optical source is buried within the screen, the visible light for the interference is emitted from the screen surface after passing through or transmitting through a part of the screen. By the way, the image being presented may be projected from the front of the screen or projected from the back of the screen.

(13) A method is proposed in which visible lights for the interference are emitted from a plurality of spots on a screen in a prescribed combination in order to have a two dimensional optical image pattern be recorded, when the image on the screen is illegally captured. This method corresponds with the method described in (5). In the method in (5), the visible light for the interference was radiated onto the screen. The present method differs in that the visible lights for the interference are radiated out of a plurality of points on a screen.

(14) A method is proposed in which a white color light for the interference, based on an average luminance between a preceding frame and an ensuing frame at target pixels, are radiated from the target pixels on a screen, during a time period in which a frame forwarding shutter shuts out a projection light in a film based projection means, which projects an image being presented onto the screen. This method corresponds to (6). While the method in (6) was based on a projection of the white color light for the interference onto the screen, the present method is based on the white color light for the interference radiating from the screen.

(15) A method is proposed in which a visible light for the interference, based on an average chromaticity and an average luminance of a preceding frame and an ensuing frame at target pixels, is radiated from the target pixels on a screen, during a time period in which a frame forwarding shutter shuts out a projection light in a film based projection means for projecting onto a screen an image being presented. This method corresponds with (7). While the method in (7) was based on a visible light for the interference being projected onto the screen, the present method differs in that the visible light for the interference is radiated from the screen.

(16) A method is proposed in which an illegal activity is interfered with by radiating a visible light for the interference from the front of a screen in a system for interfering against image capturing and by using a reflected light off of the screen surface. The present system represents an application example for the method described in (1). Therefore, the descriptions in (1) are applicable on the present system. Of course, the visible light radiation apparatus described in (A-2) is used. Furthermore, as described in (A-4), the visible light for the interference and the image being presented are synchronized, just as in other systems that will be described later.

(17) A system for interfering against image capturing is proposed, which interferes against an illegal activity by radiating a visible light for the interference from behind the screen and by using a transmitted light, that transmits through the screen toward the viewer. The present system represents an application example for the method described in (2). Several forms of transmittance are possible based on the structure and material of the screen.

(18) A system for interfering against image capturing is proposed, which radiates a visible light for the interference from behind the screen and uses a passing light, that passes through the passing part of the screen toward the viewer, in order to interfere against an illegal activity. This system represents an application example for the method described in (3). Several forms of passing parts, with various shapes and structures, are possible.

(19) A system for interfering against image capturing is proposed, which relies on a means of reflection in order to reflect a visible light for the interference and to radiate a reflected light on a screen. The present system represents an application example for the method described in (4). The means of reflection itself or the image capturing interference system may provide a means of drive for a reflection surface, in order to adjust the reflection in any direction. When the direction of reflection is variable, it is possible to precisely position the point of projection and to project the visible light for the interference toward a plurality of areas using a small number of visible light radiation apparatuses.

(20) A system for interfering against image capturing, which includes a plurality of units of the visible light radiation means, is proposed. The visible light radiation means includes a means of control for projecting the visible lights for the interference in prescribed combinations onto a plurality of areas on a screen, so that, when an image on the screen is illegally captured, a two dimensional optical image pattern may be recorded simultaneously. The present system represents an application example for the method described in (5).

The control apparatus may be a, for example, a computer, an application specific semiconductor device, or other electronic circuits. The control apparatus may be realized by hardware or software. A means of switching may also be used, when the two dimensional optical image patterns are switched periodically or are projected intermittently. For example, a means of switching may be utilized, in which the emission of light is switch controlled in response to a clock or its frequency divided output. Furthermore, another means of switching may be utilized, in which the emission is switch controlled in response to a charging and a discharging of a capacitor. In yet another example, a mechanical means of switching may be used.

When some form of information is to be encoded into the optical image pattern, a means of table may be provided that establishes correlation relationships between the optical image patterns and the information. The radiation of the visible light radiation means may be controlled, based on the information contained in the means of table, when the visible light for the interference is radiated.

(21) A system for interfering against image capturing is proposed for an image being presented on a screen by a projection method using a film based means of projection. The image capturing interference system includes a visible light radiation means for radiating a white color light for the interference onto the screen; a shutter cycle detection means for detecting the time periods during which a frame forwarding shutter shutters the projected light; a means of calculation for determining a luminance of the white color light for the interference based on an average luminance in a previous frame and an ensuing frame in the target image pixels; and a means of control for projecting the white color light for the interference onto the target image pixels during the time period in which the projection light is shuttered. The present system represents an application example for the method described in (6). In other words, the present system is suited for a black and white image being projected using a film based means of projection.

The shutter cycle detection means may be a method of mechanically detecting the frame forwarding; a method of electronically detecting the frame forwarding based on, for example, a change in an electrostatic capacitance; a method of mechanical detection based on an operation of a shutter mechanism; a method of electronic detection based on the operation of the shutter mechanism; or a method of optical detection based on the operation of the shutter mechanism.

The means of calculation calculates an average luminance for the previous frame and the ensuing frame and factors in the human contrast sensitivity increment threshold, in order to determine the luminance of the white color light for the interference that is to be radiated. The control means controls the periods of emission based on the detection results from the shutter cycle detection means. A computer, an application specific semiconductor device, or other electronic circuits may, for example, be used as the means of calculation or as the means of control. This means may be realized by hardware or by software.

(22) A system for interfering against image capturing is proposed for an image being presented on a screen by a projection method using a film based means of projection. The image capturing interference system includes a visible light radiation means for radiating a visible light for the interference onto the screen; a shutter cycle detection means for detecting the time periods during which a frame forwarding shutter shutters the projection light; a means of calculation for determining a luminance and chromaticity of the visible light for the interference based on an average luminance and average chromaticity in a previous frame and an ensuing frame in the target image pixels; and a means of control for projecting the visible light for the interference onto the target image pixels during the time period in which the projection light is shuttered. The present system represents an application example for the method described in (7). The various means described in (21) are used in the present system. Of course, the means of calculation requires a different structure for calculating the average luminance and the average chromaticity.

(23) A system for interfering against image capturing is proposed, that includes a means of radiating a visible light for the interference on to a screen, a means of driving the radiation direction for driving the means of radiating the visible light and changing the direction of radiation; a means of storage for storing information on the directions of radiation for the means of radiating the visible light in response to a screen size; and a means of radiation direction control for reading out the appropriate information on the direction of radiation from the means of storage and providing the information to the means of driving the radiation direction, when an instruction for changing the screen size is detected, and for automatically adjusting the directions of radiation of the visible light for the interference, which is emitted from the means of radiating the visible light. The present system represents an application example for the method described in (8).

The screen size (or the aspect ratio) may be standard (1:1.33), Europe Vista (1:1.66), America Vista (1:1.85), scope (1:2.35), or others. The numeric values mentioned are examples of representative values and are not limited to these values.

The means of driving the radiation direction may include, for example, a means of turning the means of visible light radiation around an attachment axis; a means of rotating or moving horizontally a platform on which the means of visible light radiation is secured; and other means. The information on the directions of radiation, which is stored in the means of storage, may include, for example, a horizontal angle, a vertical angle, or other information. Of course, control values, such as the amount of displacement, may also be included, as well as the angles. As the means of controlling the radiation directions, for example, a computer, an application specific semiconductor device, or other electronic circuits may be used.

(24) A system for interfering against image capturing is proposed in which a visible light for the interference passes through a space outside of the screen and is directly radiated on the viewer. This system represents an application example for the method described in (9). For this reason, the descriptions in (9) may apply on the present system. Since the visible light for the interference is required to pass through a space outside of the screen, the position of the visible light radiation apparatus, which radiates the visible light for the interference, can be at any location. For example, the location may be behind the screen, or the location may in front of the screen. Of course, the location may also be around the screen.

(25) A system for interfering against image capturing is proposed, which radiates a visible light for the interference from a means of radiating the visible light at the back side of a screen and transmits the visible light for the interference through the screen toward the viewer. The present system represents an application example for the method described in (10). Several forms of transmission are possible, depending on the material and structure of the screen.

(26) A system for interfering against image capturing is proposed in which a visible light for the interference, which is radiated by a means of radiating the visible light at the backside of the screen, passes through a passing part in the screen toward the viewer. The present system represents an application example of the method described in (11). In this instance also, several forms of the passing parts of various shapes and structure are possible.

(27) A system for interfering against image capturing is proposed in which a visible light for the interference is emitted by a means of radiating the visible light, which is embedded inside a screen, toward the viewer from the screen surface. The present system represents an application example for the method described in (12). The method of embedding and the forms of the output for the visible light for the interference are similar to the description in (12).

(28) A system for interfering against image capturing is proposed, that includes a plurality of units of means of radiating the visible light, and a means of control for the means of radiating the visible light provides as an output the visible lights for the interference in prescribed combinations at a plurality of locations on the screen, so that a two dimensional optical image pattern may be simultaneously recorded, when an image on the screen is illegally image captured. The present system is an application example for the description in (13). The conditions and the structures required for the basic configurations for the various means are similar to (20).

(29) A system for interfering against image capturing is proposed when an image being presented on a screen by a projection method using a film based means of projection. The image capturing interference system includes a means of radiating a visible light for radiating a white color light for the interference from target image pixels on the screen; a shutter cycle detection means for detecting the time periods during which a frame forwarding shutter shutters the projected light; a means of calculation for determining a luminance of the white color light for the interference based on an average luminance in a previous frame and an ensuing frame in the target image pixels; and a means of control for projecting the white color light for the interference from the target image pixels during the time period in which the projection light is shuttered. The present system is an application example for the description in (14).

The same means of detecting the shuttered cycles, the means of calculation, and the means of control as those in (21), respectively, may be used. The only difference from (21) is the method of radiating the white color light for the interference.

(30) A system for interfering against image capturing is proposed when an image being presented on a screen by a projection method using a film based means of projection. The image capturing interference system includes a means of radiating the visible light for radiating a visible light for the interference from target pixels on the screen; a shutter cycle detection means for detecting the time periods during which a frame forwarding shutter shutters the projection light; a means of calculation for determining a luminance and a chromaticity of the visible light for the interference based on an average luminance and an average chromaticity in a previous frame and an ensuing frame in the target image pixels; and a means of control for projecting the visible light for the interference from the target image pixels during the time period in which the projection light is shuttered. The present system is an application example for the method described in (15).

The same means of detecting the shuttered periods, the means of calculation, and the means of control as those in (22), respectively, may be used. The only difference from (22) is the method of radiating the white color light for the interference.

(C) Actual Embodiments

Specific embodiments for the methods and systems for interfering against image capturing, that are proposed in the present specification, will be described next.

(1) First Embodiment

Figure 18:
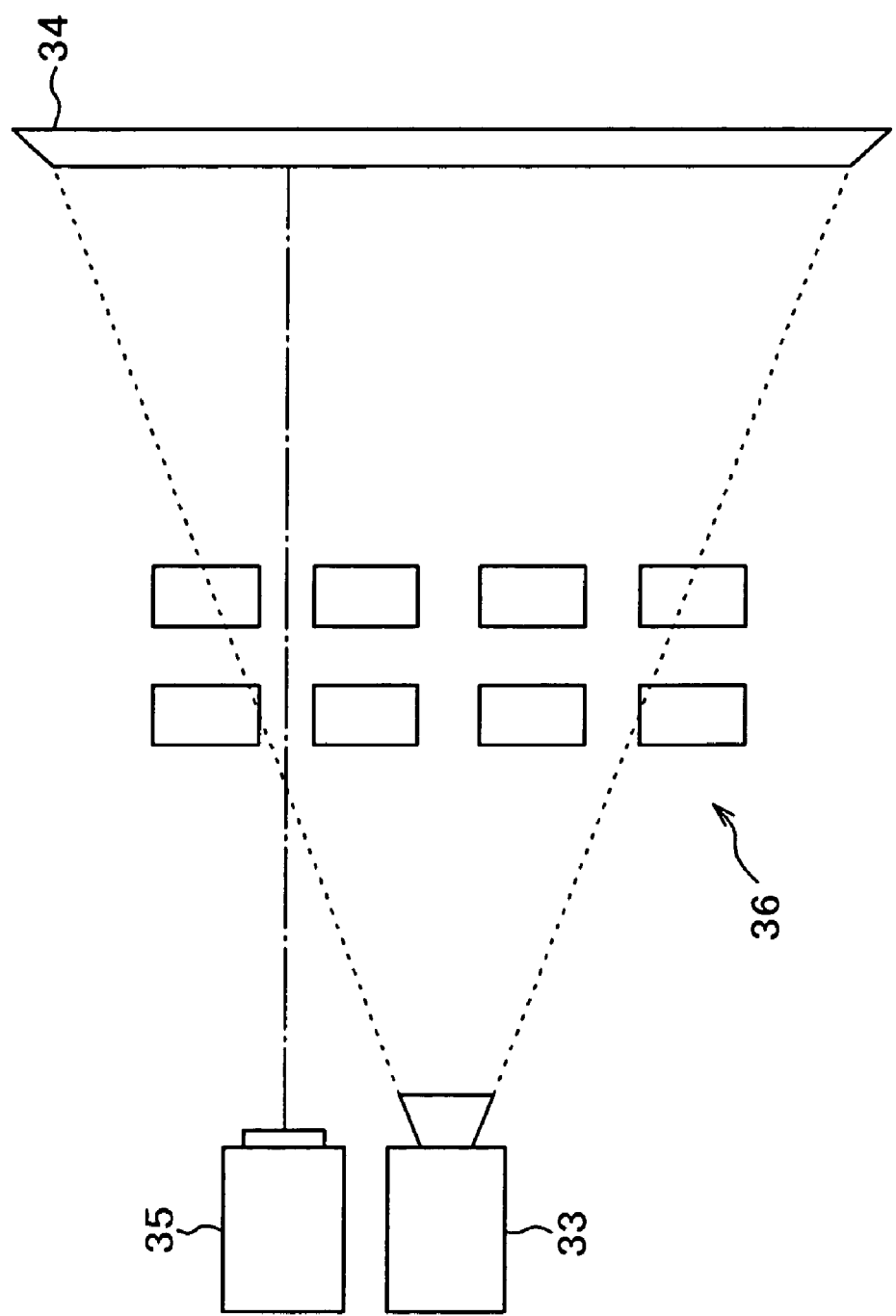
FIG. 18 is a diagram showing an example of a system based on a method of projecting a visible light for the interference from a front side of the screen.

The first embodiment is shown in FIG. 18. The present embodiment is related to an invention of a method of projecting a visible light (including a white color light) for the interference from the front of a screen (on the side of an audience) toward the screen. FIG. 18 shows an application example in a movie theater or other types of theater systems. It goes without saying that the technology itself may be applied on a home theater. In any of these instances, the image projected onto the screen may include not only movies but also television programs and other copyrighted materials. Specific examples of various apparatuses that make up the system, which are shown in FIG. 18, will be described next.

A projector apparatus 33 is a projection apparatus for projecting an image to be viewed onto a screen 34. The projector apparatus 33 may be, for example, a film projector for projecting a movie film; a slide projector for projecting a slide; an overhead projector (OHP); a liquid crystal projector that directly projects a digital image; a digital micromirror device (DMD) projector; a CRT projector, or others.

In FIG. 18, the projector apparatus 33 is placed on the back side of the seats 36, and the audience views a reflected light from the screen surface. However, the position of the projector apparatus 33 is not limited to this. For example, the projector apparatus 33 may be placed in front of the seats 36 (or between the screen 34 and the seats 36), above the seats 36, or on a side wall. Of course, with the method of projecting the image from the back side of the screen to make the audience view a transmitted light (or in a case of a rear projection method), the projector apparatus 33 may be placed behind the screen 34.

The screen 34 in FIG. 18 is a screen for a theater. In general, holes for sound sources (through holes or other structures, that communicate the back side with the front side and are called sound perforation,) are formed in order to efficiently transmit sound from sources of the sound, which are placed behind the screen, toward the audience. The screen, however, does not need to have holes for the sound sources.

The visible light radiation apparatus 35 for the interference is an apparatus for radiating a visible light, that satisfies the condition 1 and the condition 2, in order to interfere against an illegal image capturing of the image projected on to the screen. The radiation apparatuses, having the structure shown in, for example, FIG. 4 or FIG. 5, are used as this apparatus. In FIG. 18, the visible light radiation apparatus 35 is set up alongside the projector apparatus 33, but an apparatus configuration that is combined with the projector apparatus is also possible. The visible light radiation apparatus 35 may also have an ability to project the visible light for the interference on a plurality of spots on the screen. Although not shown in FIG. 18, the synchronizing apparatus, which was shown in FIG. 12 and FIG. 13, is connected to the visible light radiation apparatus 35. In general, the visible light radiation apparatus 35 may be placed in such a way as to face the screen, but a position in front of the screen at an angle is also possible.

In the figure, the visible light, radiating from the visible light radiation apparatus 35, is directly radiated on the screen surface. However, an optical beam, that is reflected off a reflective mirror, may also be projected on to prescribed areas on the screen. A higher degree of freedom is allowed for the position of the visible light radiation apparatus 35, when the optical path for the visible light is bent using a reflection mirror. Or, the visible light radiation apparatus 35 itself may be driven for directing the radiation of the visible light toward a prescribed area or space.

By the way, it is also possible to use the plurality of optical image patterns, that are projected onto the screen, in order to record prescribed information (for example, the output time and date, the output location, the screen number, the output apparatus, and other information required for identifying the individual making the output and the location of the illegal activity) or text based information (symbols and other recognizable geometrical information). In such an instance, in general, a plurality of units of the visible light radiation apparatus 35 are collectively operated. When such a function is to be implemented, a means of table (a means of storage) may be used for storing the correlation between the optical image patterns for showing the desired information and the plurality of visible light radiation apparatuses, which generate them.

The visible light that provides the information may, in general, be emitted continuously (turning light on), but the prescribed information may also be provided using a method of emitting the visible light intermittently.

In addition, the method of projecting the visible light includes a method of emitting the visible light intermittently. When the visible light is projected intermittently, the luminance of the image being recorded may change independently of the image being presented and thus degrades the image quality. Furthermore, changes in the intermittent timing and the recorded positions for the optical images may make the desired information be recorded.

The number of the visible light radiation apparatuses 35 is not limited to one unit. Although a single unit of the visible light radiation apparatus 35 is shown in FIG. 18, two or more units of the visible light radiation apparatuses may also be installed.

By radiating the visible light for the interference from the audience toward the screen according to the present embodiment, it is possible to make the desired information on, for example, the location the image capturing be recorded simultaneously with the image that has been illegally captured. Accordingly, the image quality can also be made to degrade. As a result, an interference effect comparable to but not using an infrared light can be achieved.

(2) Second Embodiment

Figure 19:
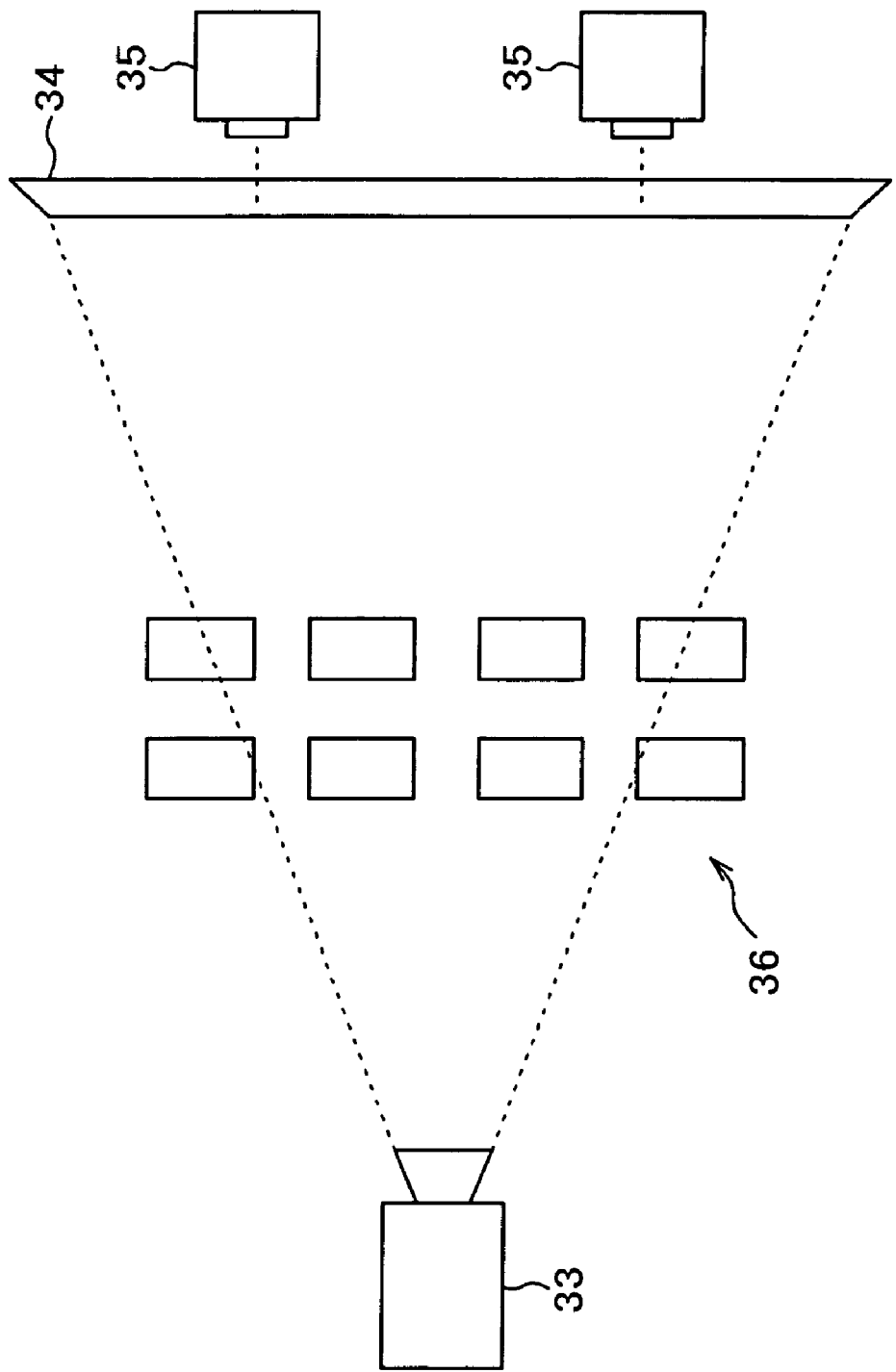
FIG. 19 is a diagram showing an example of a system based on a method of projecting a visible light for the interference from a back side of the screen.

FIG. 19 shows the second embodiment. This embodiment is related to an invention on a method of projecting a visible light for the interference (including the white color light) from the back side of a screen toward the screen. FIG. 19 also shows application examples in movie theaters and other theater systems. Of course, the technology itself may be applicable on a home theater. In any of these instances, the image being projected onto the screen may include not only movies but also television programs and other copyrighted materials. Specific examples of the various apparatuses that make up this system, which are shown in FIG. 19, will be described next. The projector apparatus 33 will not be described since it is similar to the first embodiment.

The screen 34 is a screen for a theater. In general, holes for sound sources (through holes that communicate between the back side and the front side or other structures), which are called sound perforation, are formed in order to efficiently transmit the sound from sources of the sound, which are placed behind the screen, toward the audience. Any shapes, sizes, and locations may be allowed for the sound perforation. In the specification of the present application, the sound perforation is used as passing parts for allowing the visible light for the interference to pass from behind the screen to the front of the screen.

By the way, the screen 34 in FIG. 19 does not need to include the sound perforation. In such an instance, however, the screen itself is desirable to be made of a material that may easily allow the visible light to transmit through; include embedded members that may easily allow the visible light to transmit through; or include areas that are thinner than other areas.

The visible light radiation apparatus 35 is an apparatus for radiating the visible light for interfering against an illegal image capturing of the image that is projected onto the screen. By the way, an internal configuration of the visible light radiation apparatus 35 is the same as in the first embodiment.

The visible light radiation apparatus 35 is, in general, located near the back side of the screen. However, any location may be allowed, as long as the location is behind a hypothetical reference surface, which includes the screen surface, with respect to the seats 36. For example, the visible light radiation apparatus 35 may be placed behind the screen 34 at an angle. By the way, the point of emission may be in contact with the screen, or the point of emission may be embedded into the screen. The point of emission, that is embedded into the screen, may be exposed at the surface of the screen toward the front.

Figure 20:
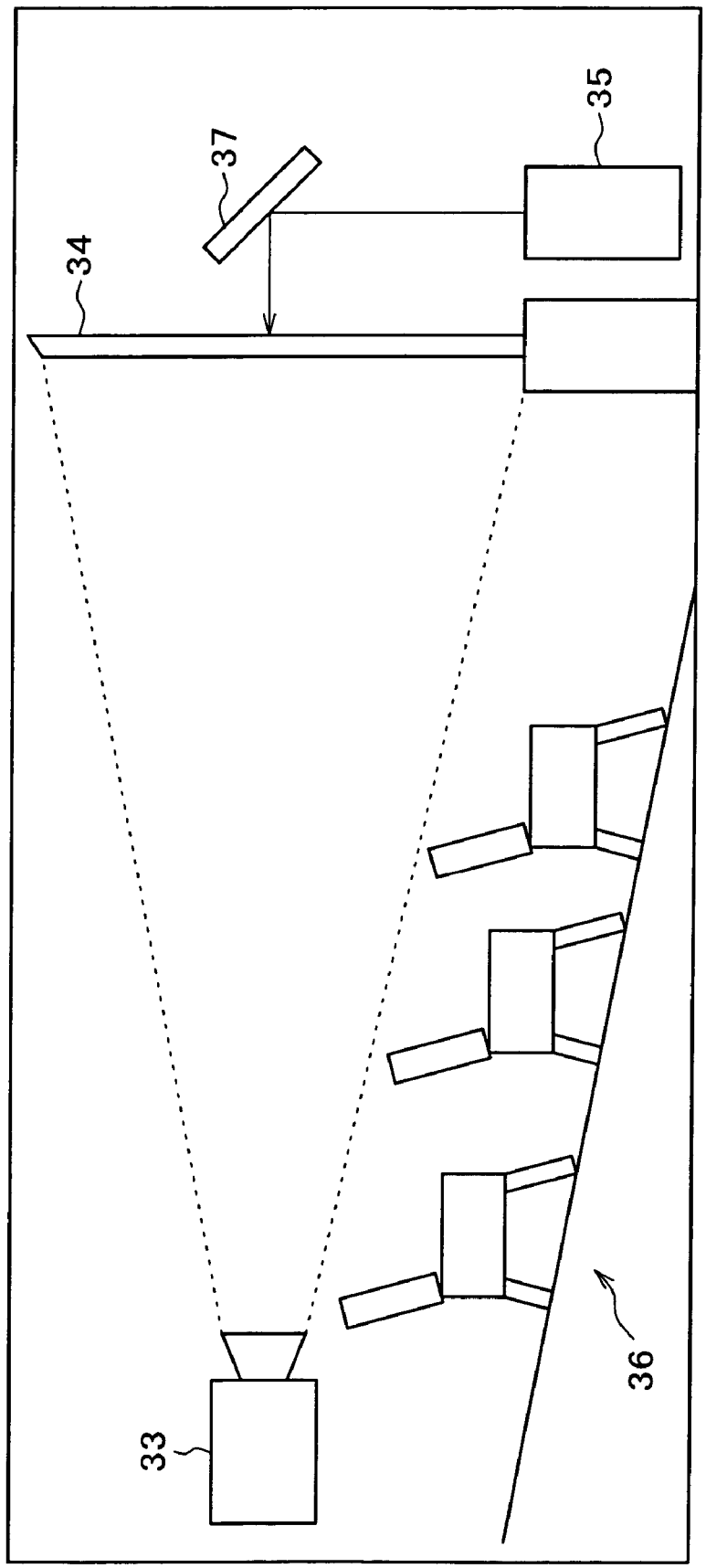
FIG. 20 is a diagram showing an example of a system based on a method of projecting a visible light for the interference, which is reflected by a means of reflection, from a back side of the screen.

In the figure, the visible light that is radiated from the visible light radiation apparatus 35 is directly radiated on to the screen surface. However, as shown in FIG. 20, a beam of light reflecting off a reflection mirror 37 may be projected at prescribed areas on the screen. A higher degree of freedom may be allowed for the position of the visible light radiation apparatus 35, when the reflection mirror is used for bending the optical path for the visible light. Furthermore, instead of reflecting the visible light through the means of reflection, the visible light radiation apparatus 35 itself may be driven to direct the direction of radiation for the visible light toward the prescribed area or space, as mentioned earlier.

Even in such an instance, prescribed information or text information may be recorded using a plurality of optical image patterns projected onto the screen. Normally, a plurality of units of the visible light radiation apparatus 35 are collectively operated. In order to realize this feature, a means of table (means of storage) is used for storing relationships of correlation between the optical image patterns, that represent the desired information, and the plurality of units of the visible light radiation apparatus that generate them.

In general, the visible light that provides this information is lit on continuously (turning light on), but it is also possible to present the prescribed image using a method of intermittently emitting the visible light.

Furthermore, the method of projecting the visible light includes a method of intermittently emitting the visible light. When the visible light is projected intermittently, the luminance of the image being recorded changes independently of the image being presented and thus degrades the quality of the image. By the way, a recording of desired information can also be facilitated by making the timings of intermittence and the recording positions of the optical images variable.

The number of units of the visible light radiation apparatus 35 is not limited to a single unit. Although a single unit of the visible light radiation apparatus 35 is shown in FIG. 20, it is also possible to use two or more units of the visible light radiation apparatuses.

By radiating the visible light for the interference onto the screen from behind the screen, as in the present embodiment, it is possible to have the desired information, that shows, for example, the location of the image capturing, be recorded in the image that has been captured illegally. Accordingly, it is also possible to degrade the quality of the image. As a result, it is possible to realize an interference effect similar to but not using the infrared light.

(3) Third Embodiment

Figure 21:
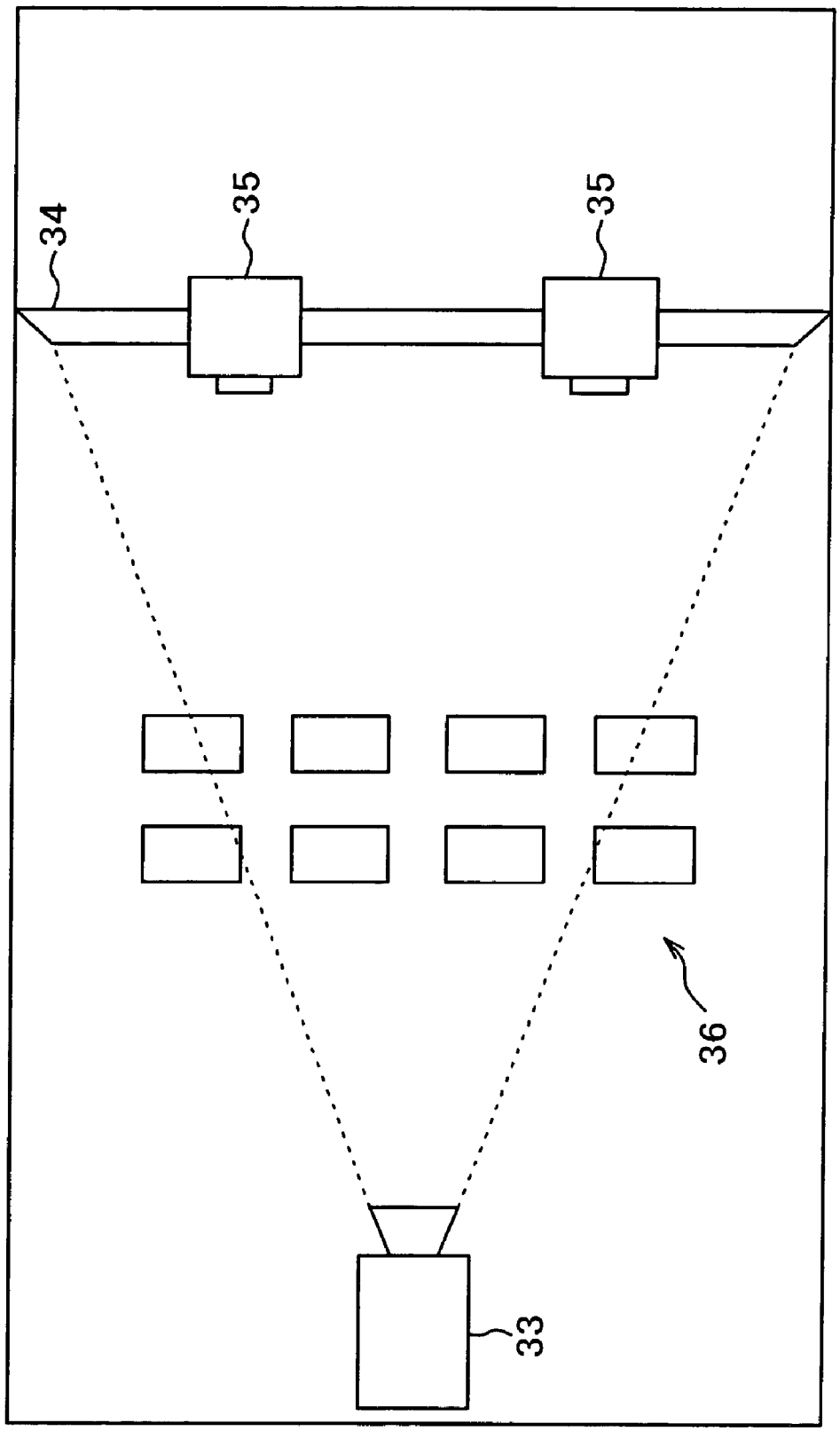
FIG. 21 is a diagram showing an example of a system based on a method of radiating a visible light for the interference from the screen periphery toward the audience.

FIG. 21 shows the third embodiment. The present embodiment is related to an invention on a method of radiating a visible light for the interference from a screen periphery toward the audience. In an example shown in FIG. 21, the visible light radiation apparatus 35 is placed outside of an upper side of a screen 34 (above). FIG. 21 also represents an application example in a movie theater and other theater systems. Of course, the technology itself is also applicable on a home theater. The image being projected onto the screen not only includes movies but also television programs and other copyrighted materials.

Next, specific examples of the various apparatuses, that make up the system shown in FIG. 21, will be described. Because the projector apparatus 33 is similar to the embodiments described earlier, it will not be described. A screen 34 is also similar to the previous embodiment.

The visible light radiation apparatus 35 has a similar apparatus configuration as the previous embodiment. The position of and a projection method used for the visible light radiation apparatus 35 are different. By the way, the visible light being radiated from a position outside of the screen, as in the present embodiment, is required to satisfy the condition 1 and condition 2 with respect to a background light, so that the visible light for the interference may not be detected during a normal viewing.

The position of the visible light radiation apparatus 35 is usually near an outer edge of the screen. The closer it is to an area, onto which the image being presented is projected, the more likely the visible light, that is being projected, may be recorded, because the visible light may be within a field of image capturing, be recorded directly, and more likely affect the field of image capturing. A more significant interference effect is thus achieved. However, the interference effect may not necessarily be less significant in a position that is further outside of the edge of the screen.

In such an instance, a means of reflection may be used to bend the optical path for the visible light for the interference. When a reflection mirror is used for bending the optical path for the visible light, a higher degree of freedom is allowed for the position of the visible light radiation apparatus 35. Furthermore, as described earlier, instead of reflecting the visible light through a means of reflection, the visible light radiation apparatus 35 itself may be driven to direct the radiation of the visible light toward the above-mentioned prescribed area or space.

The visible light that provides this information is, in general, emitted continuously (turning light on). However, a prescribed information may also be provided by a method of emission, in which the visible light is emitted intermittently.

In addition, the method of projecting the visible light includes a method of emitting the visible light intermittently. When the visible light is projected intermittently, the luminance of the image being recorded may change independently of the image being presented and thus degrade the quality of the image. By the way, desired information can be made to be recorded by making the timings of intermittence and the recording positions of the optical images variable.

Furthermore, the number of the visible light radiation apparatus 35 is not limited to a single unit. While FIG. 21 shows a single unit of the visible light radiation apparatus 35 being used, two or more units of the visible light radiation apparatus may also be used.

When the visible light for the interference passes through a space outside of the screen and is radiated toward the audience, as in the present embodiment, it is possible to have the desired information, that shows, for example, the location of the image capturing, be recorded into the image that has been illegally captured. Of course, it is also possible to degrade the quality of the image. As a result, an interference effect similar to but not using the infrared light can be realized.

(4) Fourth Embodiment

Figure 22:
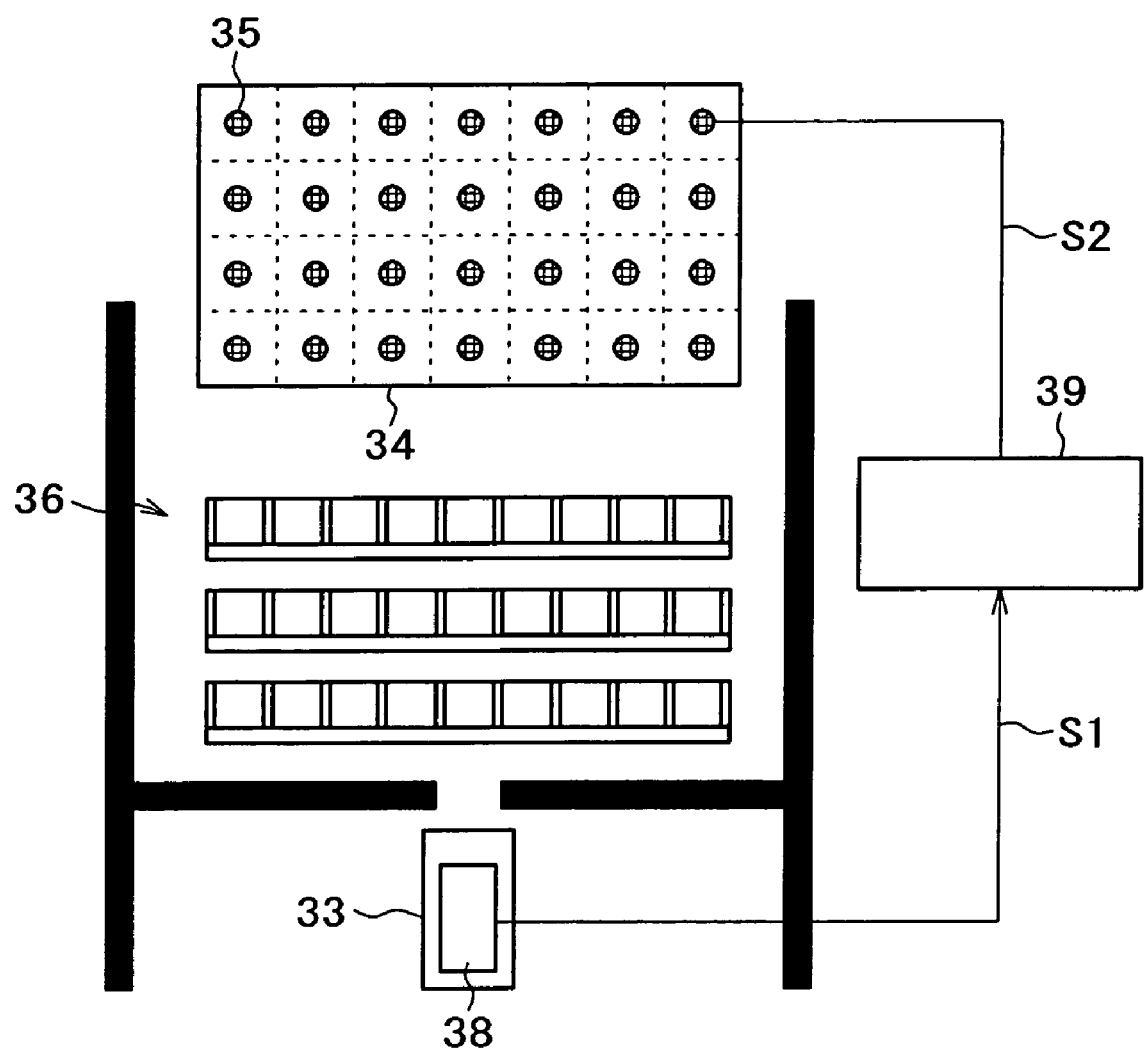
FIG. 22 is a diagram showing an example of a system based on a method of radiating a visible light for the interference during a period of shuttering.

FIG. 22 shows the fourth embodiment. The present embodiment relates to an invention on a method of radiating the visible lights for the interference during the times in which the frame forwarding shutter shuts out the projected light. FIG. 22 shows examples of applications in movie theaters and other theater systems. However, like the other embodiments, the technology itself can be applied on a home theater. Of course, the image being projected onto the screen is not limited to movies but also includes television programs and other copyrighted materials.

Next, specific examples of various apparatuses, that make up the system shown in FIG. 22, will be described. The system shown in FIG. 22, like the system in the second embodiment, includes a visible light radiation apparatus 35 for the interference, that is placed behind a screen 34 (or embedded in the screen 34). In this respect, the present embodiment is an example of the second embodiment. Therefore, the same projector apparatus 33 and the screen 34 as the second embodiment are used. By the way, the technology related to the present embodiment may also be applicable on the visible light being radiated from the front of the screen onto the screen.

In the present embodiment, a surface of the screen is divided into 28 virtual partial areas, which make up four columns and seven rows. One unit of the visible light radiation apparatus 35 is placed for each partial area.

A shutter sensor 38 is effective in a film based projector apparatus, which is used as a projector apparatus 33. Therefore, this type of shutter sensor 38 may not exist in the projector apparatus 33 that is based on a digital signal format. The shutter sensor 38 is used for projecting the visible light for the interference onto the screen during the time period, in which the shutter 42 in the film based projector apparatus (i.e. a movie projector) shutters the projection light.

Figure 23:
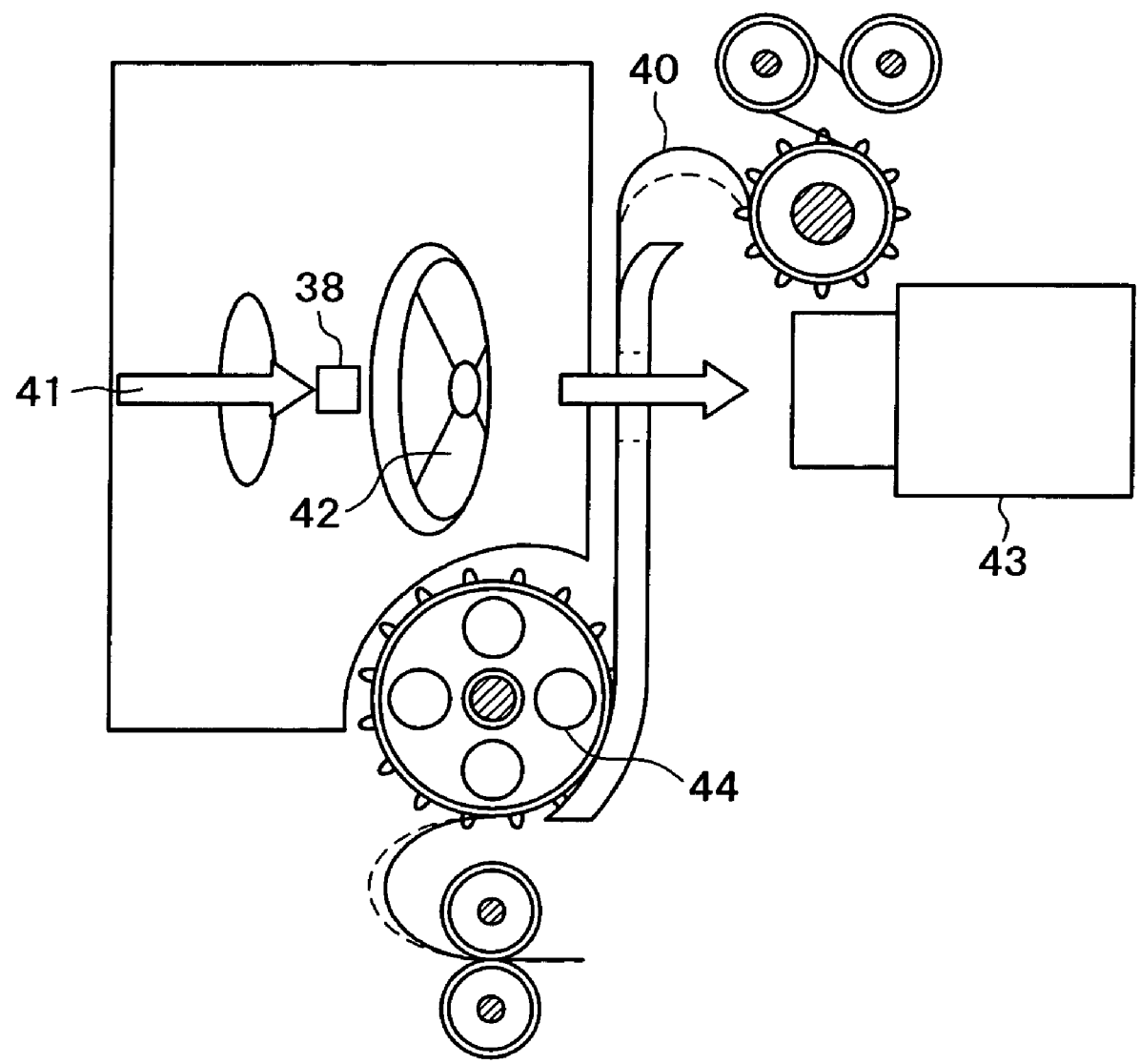
FIG. 23 is a diagram showing an example of a configuration of a projector apparatus using a film.

FIG. 23 shows a representative configuration example for this feature. The movie projector projects an image onto the screen through a repetition of a step for projecting the image onto the screen by radiating an optical source light 41, while a film 40 is stationary in an aperture (a window for projecting the film in the projector); and a step in which the optical source light 41, that is radiated on the film 40, is shuttered, and, during which time, the film is frame forwarded. The lens 43 in the figure is a projection lens for projecting the optical source light onto the screen 34.

Figure 24:
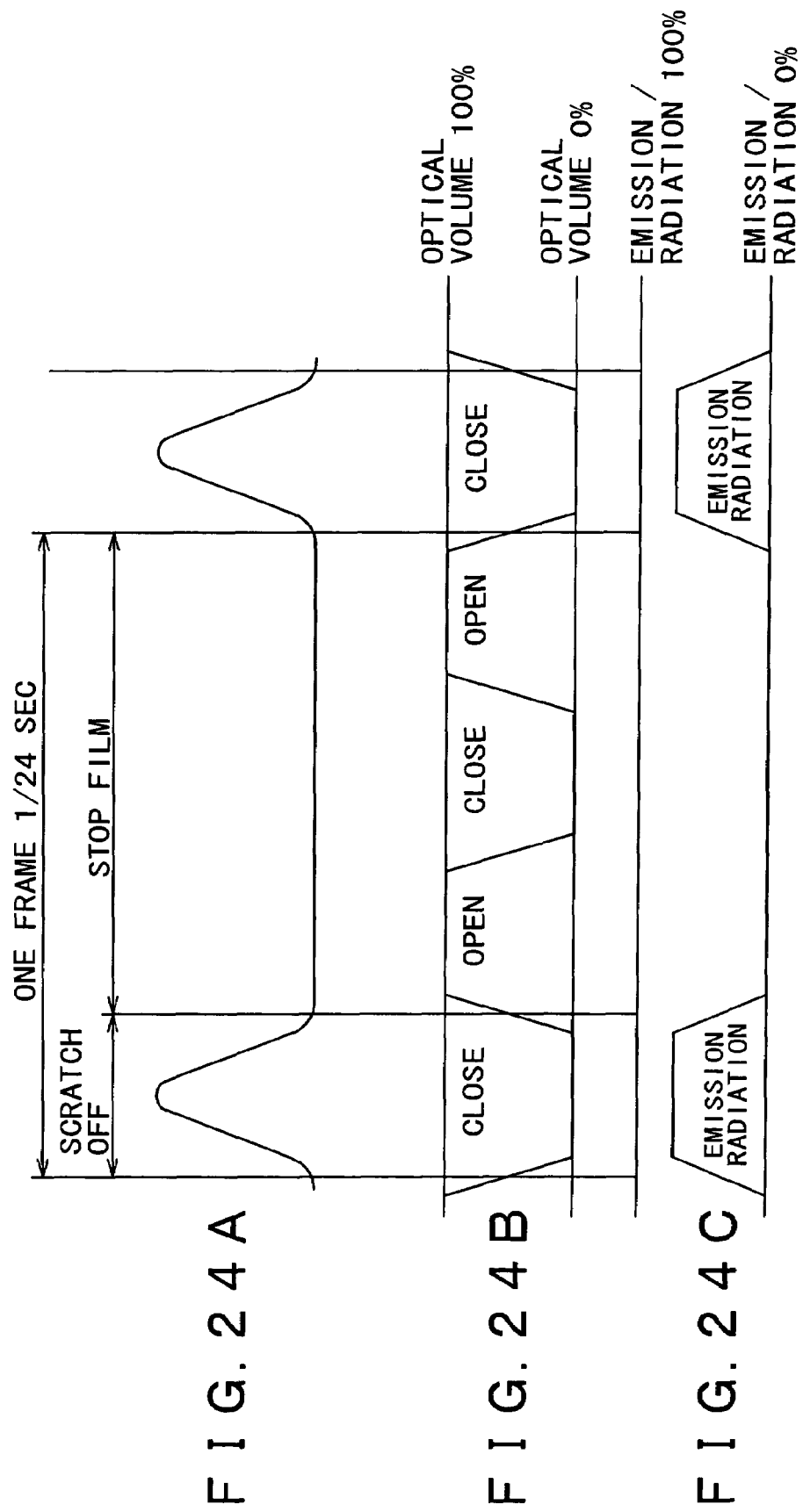
FIG. 24 is a diagram showing a relationship between a shutter operation and a projection operation for a visible light for the interference.

In general, the shutter 42 for shuttering the optical source light is a disc with slits. Normally, the slits are formed at two symmetrical positions on the disc. Normally, the disc rotates 24 times in each second and shuts out the optical source light twice for each frame (FIG. 24(B)). An intersprocket 44 forwards the film 40 by one frame during a period, in which one of the two times the light is shuttered for each frame (FIG. 24(A)). As a result, the visible light radiation apparatus 35, which runs in conjunction with the shutter 42 with the same operation timing, radiates the visible light once per frame (FIG. 24(C)).

By the way, the luminance and chromaticity of the visible light being radiated satisfy the condition 1 and the condition 2 with respect to a background light, which is assumed to have an average luminance and an average chromaticity between a previous frame and an ensuing frame. For this reason, the visible light may have a luminance of a value between 0% and 100%.

Figure 25:
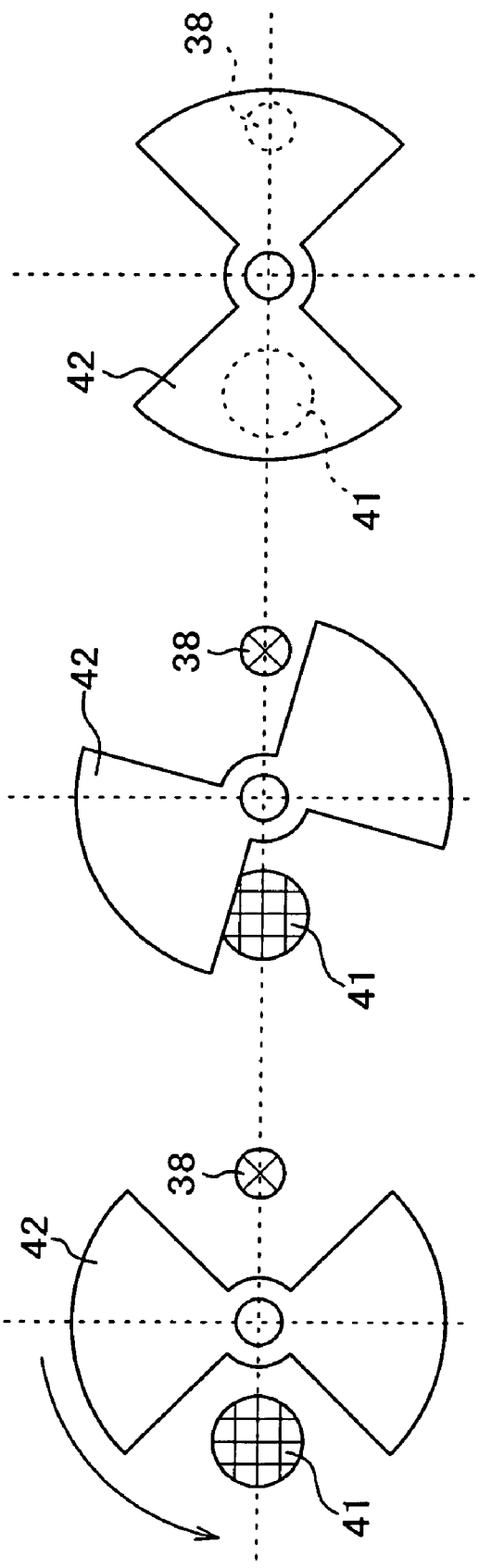
FIG. 25 is a diagram showing an example of a shutter sensor layout.

The shutter sensor 38 may operate based on an optical method, as well as an electronic method or a mechanical method. For example, a method shown in FIG. 25 may be used for the optical method. FIG. 19 shows a method of identifying positions (rotational positions), at which the shutter 42 shutters the optical source light, using a beam of light reflecting off the shutter surface. FIG. 25(A) shows the optical source light 41 being projected, FIG. 25(B) shows the shutter 42 starting to shutter the light, and FIG. 25(C) shows the shutter 42 shuttering the optical source light 41.

When the method shown in FIG. 25 is used, the shutter sensor 38 is placed in such a way as to face the blades of the shutter 42, when the light is shuttered. The shutter sensor 38 may, for example, be a light emitting diode (a means of light emission) and a photo diode (a means of receiving light), which are placed on a surface that faces the shutter 42, for example. By adopting such a layout, it may be possible to detect the relative positions of the shutter, because a large volume of light may be received by the photo diode, when the optical source light is shuttered, while the volume of light may go down during projection.

Furthermore, the optical based method also includes a method in which the light emitting diode and the photo diode are placed in such a way as to face each other while sandwiching the rotating area of the disc, and the relative position of the shutter 42 (rotation position) is detected based on whether or not a beam of light radiating from the light emitting diode is received by the photo diode. In this instance, the rotation position of the disc can be detected based on the timings with which the light, which emits from the light emitting diode, is received by the photo diode or shuttered from the photo diode.

In addition, the shutter sensor 38 may rely on a method of mechanically detecting the rotational position of the disc. For example, the rotational position of the shutter may be mechanically detected based on the rotational position of a gear (the position of teeth), which is attached coaxially with respect to the rotation axis. In yet another example, electrodes may be installed, with the rotating area of the disc sandwiched in between, and the detection method may be based on measuring the changes in the static capacitance between the electrodes in order to detect whether a blade in the disc or a gap is between the electrodes. Furthermore, another method is possible in which the rotational position of the shutter is detected based on the information related to the drive of the rotation axis.

Furthermore, it goes without saying that, when the shape of the shutter varies or the method of the shutter varies, an appropriate form of the shutter sensor 38 may be used in response to the shapes or the forms. For example, when the opening and closing of the shutter is controlled electronically, then the periods, during which the optical source light is shuttered, may be detected based on a method that relies on the signals for the opening and the closing.

A method of using a detection result may include a method in which an infrared light is emitted, when a closing of the shutter is detected, or a method in which the closing of the shutter is predicted based on the detected results, and the infrared light is emitted based on a predicted timing.

The visible light radiation control apparatus 39 is a means of controlling the light emitted by the visible light radiation apparatus 35 based on the shutter information S1, which is received from the shutter sensor 38. In the present embodiment, a process of determining the luminance and the chromaticity of the visible light being radiated is executed by the visible light radiation apparatus 35. It is also possible, by the way, to have the visible light radiation control apparatus 39 execute the process of determining the chromaticity and the luminance.

The internal configuration of the visible light radiation control apparatus 39 varies in response to the application system. For example, as shown in FIG. 22, a computer, that consists of a processor unit, which includes a control apparatus and an arithmetic apparatus, a memory apparatus, and an input and output apparatus, may in general be used for a system that may completely control the visible light radiation apparatus 35. However, it is also possible to realize the functions provided by a program, that is executed by the computer, by using, instead, an electronic circuit.

For example, a desired interference effect may be realized, without using a control apparatus, by simply using the detection results from the shutter sensor 38 as a control signal for turning on or off the visible light radiation apparatus 35.

Returning to the instance in which the visible light radiation control apparatus 39 is used. For example, when the shutter sensor 38 detects a closing of the shutter (or the projection light being shuttered), the visible light radiation control apparatus 39 may provide a control signal S2, as an output to send an instruction to the visible light radiation apparatus 35 to radiate the visible light. In this instance, the visible light radiation control apparatus 39 may instruct all of the visible light radiation apparatuses to radiate the visible light (in the example in FIG. 22, the instruction may be sent to all 28 units of the visible light radiation apparatuses). On the other hand, the visible light radiation control apparatus 39 may also send an instruction to radiate the visible light only to some of the visible light radiation apparatuses. In the example in FIG. 22, for instance, the instructions for radiating the visible light may be sent in such a way that the emitted light pattern may be in a checker pattern. Furthermore, the instruction for projecting the infrared light may be provided to make the emitted light patterns form another recognizable geometric pattern, such as a character or a symbol.

An effect similar to superimposing the visible light for the interference onto the image being projected can also be realized by the visible light for the interference, including the white color light, that is emitted only during the periods of frame forwarding, as in the present embodiment.

(5) Fifth Embodiment

Figure 26:
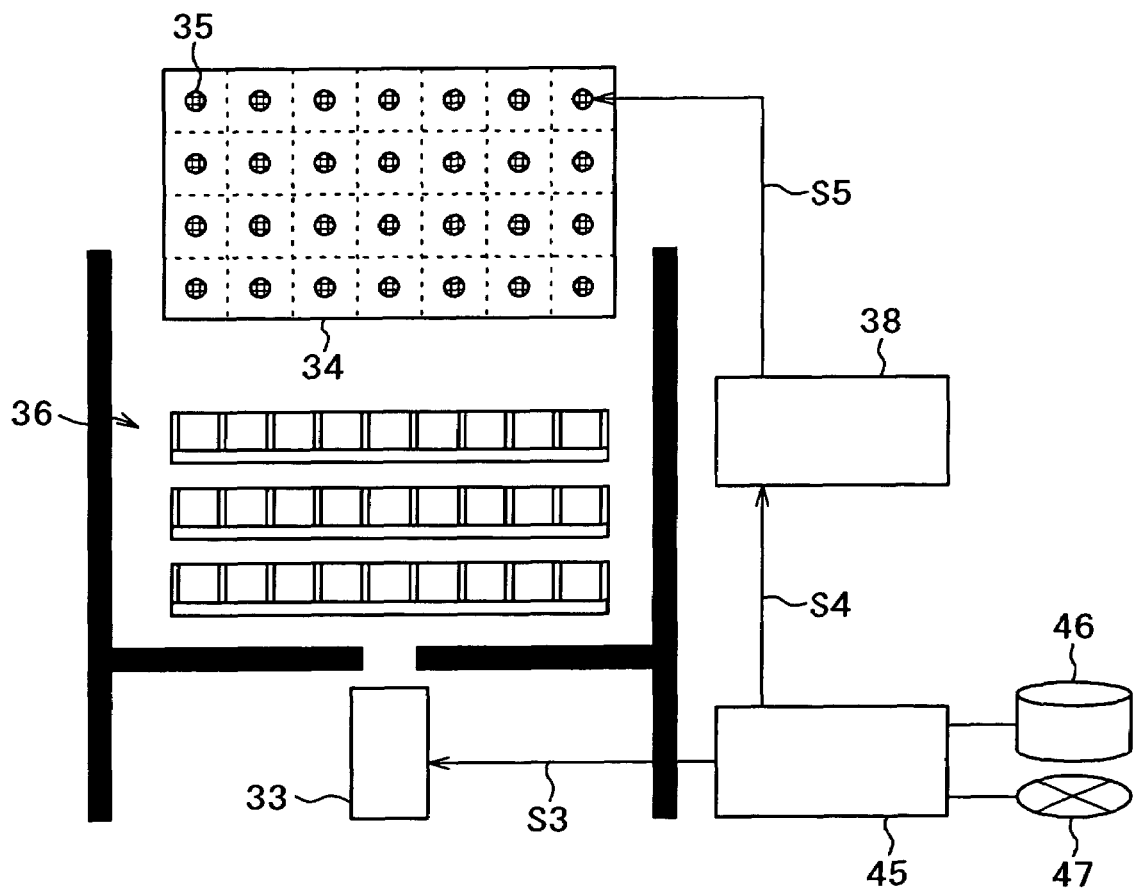
FIG. 26 is a diagram showing an example of a system based on a method of controlling a radiation of a visible light for the interference based on reproduced data or received data.

FIG. 26 shows the fifth embodiment. The present embodiment is a variation of the embodiment described earlier. The present embodiment is characterized in that the information related to the time and area of projection for the visible light for the interference, as well as information related to the luminance and the chromaticity of the visible light for the interference, is obtained through a recording medium or a network, as needed.

In FIG. 26, the image being presented is projected from the front of the screen, while the visible light for the interference is radiated from behind the screen. Of course, this figure represents only a single example, and the present embodiment is applicable on the image being presented that is projected from behind the screen, as well as the visible light for the interference projected from the front of the screen. Only the configuration of the apparatus that is specific to the present embodiment will be described next.

A program server 45 is an apparatus for feeding out the image data S3 to the projector apparatus 33. The image data S3 may include data read out from a recording medium 46 (which may include, for example, a videotape, a CD-ROM, a DVD, etc.) as well as data received through a network 47. Such an output of the image data S3 may not take place, however, when the projector apparatus 33 is a film based projector apparatus.

The program server 45 reads out the information related to the timing or the information related to the positions of partial areas, on which the visible light radiation may be applied, by functioning as an apparatus for reproducing information from the recording medium 46 or by functioning as an apparatus for receiving data from the network 47. In other words, the program server 45 also functions as an apparatus for feeding out the visible light radiation control data S4 into the visible light radiation control apparatus 39. By the way, the recording medium may be those provided through a postal service or a home delivery service or a recording of the data received in advance through a distribution over the network 47. Furthermore, the visible light radiation control data S4 may include information related to the relationships between the chromaticity and the luminance of the visible light.

In this instance, the image data S3, which is fed to the projector apparatus 33, and the visible light radiation control data S4, which is fed to the visible light radiation control apparatus 39, are synchronized by the program server 45. Of course, the synchronization of the data is controlled based on a common synchronization data or information related to the timing of the data reproduction in a digital format projection system. By the way, the timing of the output for the visible light radiation control data S4 is controlled based on synchronization signals and information related to positions, which are read from a film, as well as information related to the rotational position of the shutter 42, if the projector apparatus 33 is film based.

The visible light radiation control apparatus 39 is a means of actually controlling the emission of light from the visible light radiation apparatus 35. Similar to the sixth embodiment, the visible light radiation control apparatus 39 may instruct all units of the visible light radiation apparatuses 35 to radiate the visible light or provide instructions to only some of the visible light radiation apparatuses 35 to radiate the visible light.

An effect similar to the previous embodiments is realized by controlling the emission of the visible light for the interference using data read from a recording medium or data received through a network, as in the present embodiment.

(6) Sixth Embodiment

Figure 27:
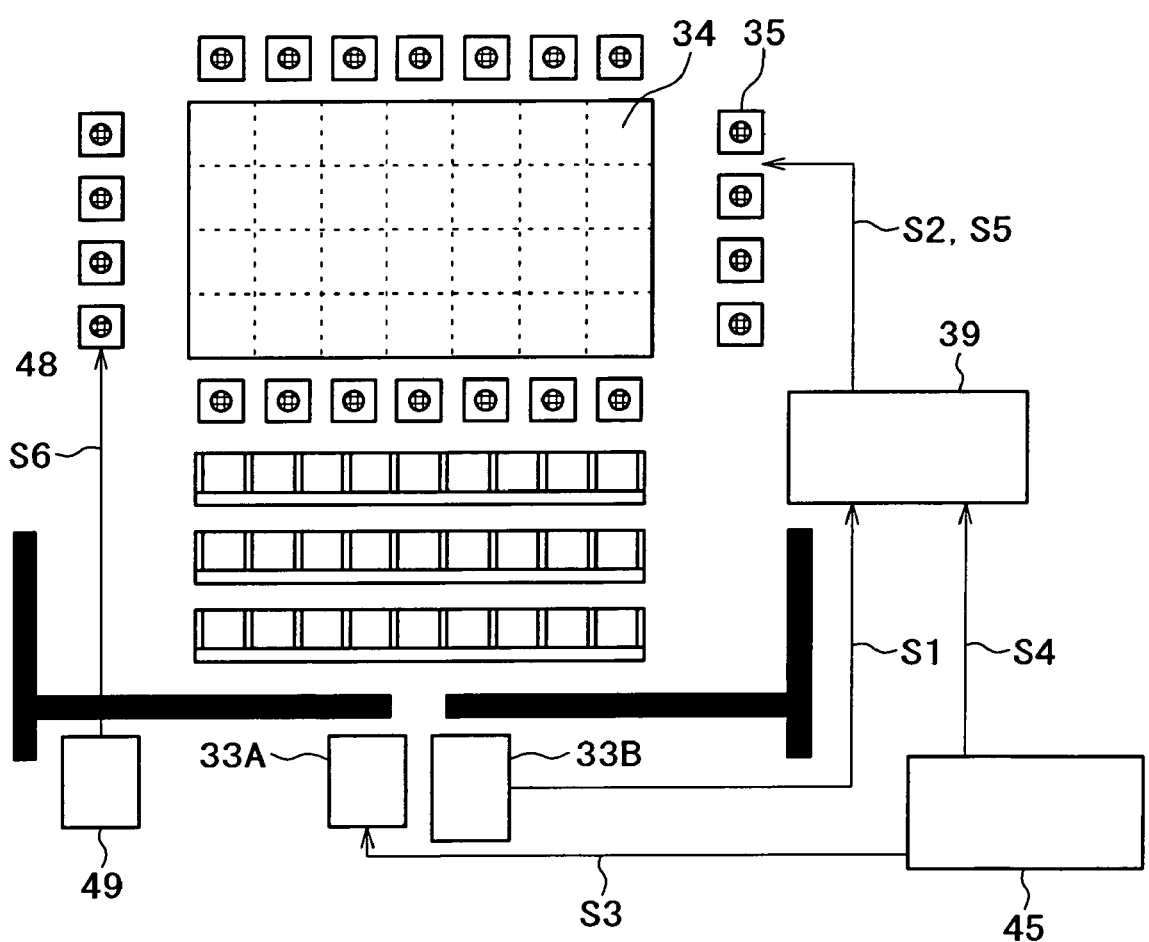
FIG. 27 is a diagram showing an example of a system based on a method of automatically adjusting a projection position, which is linked to a change in the screen size.

FIG. 27 shows the sixth embodiment. The present embodiment represents an application example in which the directions of radiation for the visible light is automatically adjusted in response to changes in the screen size, which are dependent on the contents. In FIG. 27, a system combines the present invention and the fourth embodiment described earlier (invention in which the timing of the emission of the visible light is controlled based on information related to the shutter), and the fifth embodiment (invention in which the timing of the emission of the visible light is controlled based on the visible light radiation control data).

FIG. 27 also shows applications examples in a movie theater or other types of theater systems. As in the other embodiments, the technology itself is also applicable on a home theater. Of course, the image being projected onto the screen may include not only movies but also television programs and other copyrighted materials.

Firstly, the method of positioning the visible light radiation apparatus 35 will be described. In FIG. 27, the visible light radiation apparatus 35 is placed at a position that is slightly in front of the screen peripherally (For example, at an outer edge of the screen or in an area outside of the frame). Of course, the visible light radiation apparatus 35 may be placed at any position, including a position that directly faces the screen, and does not need to be near the screen, as long as the position is in front of the screen. Furthermore, the visible light radiation apparatus 35 may be placed at any arbitrary position behind the screen as well.

In FIG. 27, seven units of the visible light radiation apparatuses 35 are placed along the top edge and bottom edge of the screen, along the longer side direction of the screen (the transverse direction). Furthermore, four units of the visible light radiation apparatuses 35 are placed on the right hand edge and the left hand edge of the screen, along the shorter side direction of the screen (the longitudinal direction). On the other hand, the visible light radiation apparatuses 35 may also be placed on only one of the edges, or the visible light radiation apparatuses 35 may be placed on any two of the edges, or the visible light radiation apparatuses 35 may be placed on any three of the edges. Of course, any number of units of the visible light radiation apparatuses 35 may be placed.

The apparatuses that are characteristic to the system shown in FIG. 27 will be described next. Other apparatuses, which are common to the other embodiments, will not be described in particular. There are two apparatuses that are characteristic, which are the radiation direction drive apparatus 48 and a screen mask change apparatus 49. These apparatuses are used for automatically adjusting the directions and positions of the radiation of the infrared light in conjunction with switching of screen sizes, when there is a plurality of screen sizes in correspondence with the images being projected.

FIG. 28 shows an example of how the visible light radiation apparatus 35 may be attached on to the radiation direction drive apparatus 48. In FIG. 28, the radiation direction drive apparatus 48 is attached on to the rear side of the visible light radiation apparatus 35, or on the side that is opposite from the direction of projection of the visible light, and can turn freely. The axis of turning is orthogonal to the direction of the optical axis. The visible light radiation apparatus 35 is linked to a motor in the radiation direction drive apparatus 48 through, for example, gears and is attached in such a way that the visible light radiation apparatus 35 may turn by a prescribed angle in a prescribed direction in response to an amount of motor rotation.

The means of drive, however, is not limited to a method in which a force is transmitted based on an amount of rotation and may include a method in which a force is transmitted based on an amount of displacement in a linear direction. Furthermore, the means of drive may be applied directly on the visible light radiation apparatus 35 or applied indirectly through linking devices, which may include gears, rubbers, and others. Furthermore, while the displacement takes place in only one direction in FIG. 28, the displacement may also take place in two directions. For example, the displacement may made be possible in two directions that include the horizontal direction and the vertical direction.

The screen mask change apparatus 49 is a means of automatically feeding the information related to the drive control for the visible light radiation apparatus to the radiation direction drive apparatus 48 in response to an instruction to change the screen size. For example, the screen mask change apparatus 49 may include a memory unit that stores information (for example, information related to the direction of radiation or angle) that correlates the screen size and the corresponding projection directions for the infrared projection apparatus, and a control unit that reads out appropriate numerical values for the new screen size, when the screen size is changed, from the memory unit, and feeds the information to the radiation direction drive apparatus 48 for the various positions. If the information provided as an output to the radiation direction drive apparatus 48 were not the target values (the optimal values), as in the present example, then the amount of adjustment (a differential value) with respect to the present value, may be calculated and provided. One of these data is provided by the screen mask change apparatus 49 to the radiation direction drive apparatus 48 as the control data S6 output.

By the way, instructions related to changes in the screen size or information on the optimal screen size may, in some cases, be provided in conjunction with a manual operation by an operator or, in other cases, provided automatically based on information recorded in association with the image contents. In a movie theater, for example, the operator at the theater operates buttons for changing the position of the mask, when the screen size, or the aspect ratio, changes. The same button operation may also be used for manipulating a change in the direction of the projection. Or, as in the latter case, in which the recorded information is to be used, the optimization information may be recorded either in the media itself, that stores the image contents, or in another recording medium, that is separate from the image contents, in a form of a mapping table.

While in FIG. 27 the radiation direction drive apparatus 48 and the screen mask change apparatus 49 are represented as separate units, it is also possible to combine the two into a single apparatus. The adjustment of the direction of the radiation for the infrared light may be performed for each visible light radiation apparatus or by rows or by few adjacent units of the visible light radiation apparatuses.

By automatically adjusting the direction of the projection for the visible light in response to the screen size, as in the present embodiment, it is possible to avoid the projection positions of the visible light and the image contents from being out of synchronicity. By the way, a similar effect can be realized by controlling the luminance information and the chromaticity information for the visible light, that is fed to the visible light radiation apparatus, instead of controlling the direction of projection for the visible light.

(7) Seventh Embodiment

In the various embodiments described above, representative and specific examples of the conceptual embodiments are reviewed. Systems that combine the various embodiments described above or other examples of variation are also possible.

By using the visible light that satisfies the condition 1 and the condition 2, as mentioned above, it is possible to make an optical image, that is unrelated to the image being presented, be superimposed with and recorded in an illegally captured version of the image on the screen, although the optical image may not be visible to the audience in the normal viewing. As a result, it is possible to interfere against an illegal image capturing activity.

The invention claimed is:

1. A method of preventing image capturing, comprising the steps of:
   radiating a visible light for an interference onto a same screen as an image being presented,
   wherein an optical image of the visible light for the interference is indistinguishable from the image being presented on the screen, and
   wherein the optical image of the visible light for the interference is distinguishable from the image being presented when recorded, and
   wherein the optical image of the visible light for the interference is controlled to match an identical area as the image being presented, and
   wherein a luminosity of the visible light for the interference is controlled to be lower than or substantially equal to an increment threshold of the human contrast sensitivity, which is calculated from a luminance at an area of the image onto which the visible light is projected for superimposition.

2. The method of claim 1 wherein the visible light for the interference is a composite light consisting of a plurality of single colored lights, which have different chromaticities.

3. The method of claim 1 wherein a chromaticity and a luminance of the visible light for the interference is variably controlled in response to the image being presented and projected onto the screen.

4. The method of claim 1 wherein a chromaticity of the visible light for the interference is controlled to match a chromaticity of the image being presented.

5. A method of preventing image capturing, comprising the steps of:
   radiating a visible light for an interference onto a same screen as an image being presented,
   wherein an optical image of the visible light for the interference is indistinguishable from the image being presented on the screen,
   wherein the optical image of the visible light for the interference is distinguishable from the image being presented when recorded,
   wherein the optical image of the visible light for the interference is controlled to match an identical area as the image being presented, and
   wherein the visible light for the interference is radiated from a viewer's side onto the screen, and a reflected light that is reflected off the screen is used for interfering against the illegal activity.

6. The method of claim 1 wherein the visible lights for the interference in a prescribed combination are projected onto a plurality of locations on the screen, so that a secondary optical image pattern is recorded simultaneously, when the image on the screen is illegally image captured.

7. The method of claim 1 wherein, when the image being presented is projected onto the screen by a film based means of projection, a white color light for the interference, a luminance in a target image pixel of which is determined based on an average luminance between a preceding frame and an ensuing frame, is radiated onto the target image pixel on the screen during a time period in which a frame forwarding shutter shutters a projection light.

8. The method of claim 1 wherein, when the image being presented is projected onto the screen by a film based means of projection, the visible light for the interference, determined based on an average chromaticity and average luminance between a previous frame and an ensuing frame at a target image pixel, is radiated onto the target image pixel on the screen during a time period in which a frame forwarding shutter shutters a projection light.

9. The method of claim 1 wherein, when a screen size is changed, a direction of radiation of the visible light for the interference is automatically adjusted.

10. A system for preventing image capturing comprising:
   a visible light radiation means for radiating a visible light for an interference onto a same screen as an image being presented,
   wherein an optical image of the visible light for the interference is indistinguishable from the image being presented on the screen, and
   wherein the optical image of the visible light for the interference is distinguishable from the image being presented when recorded, and wherein the optical image of the visible light for the interference is controlled to match an identical area as the image being presented; and a control means for controlling a luminance of the visible light for the interference to lower than or substantially equal to an increment threshold for human contrast sensitivity, which is calculated based on a luminance in an area of the image onto which the visible light for the interference is projected in a superimposing manner.

11. The system of claim 10 wherein the visible light radiation means outputs a composite light consisting of a plurality of single colored lights, that have different chromaticities, as the visible light for the interference.

12. The system of claim 10 further comprising a control means for variably controlling a chromaticity and a luminosity of the visible light for the interference in response to the image being presented that is projected onto the screen.

13. The system of claim 10 further comprising a control means for controlling a chromaticity of the visible light for the interference in such a way as to match a chromaticity of the image being presented.

14. The system of claim 10 wherein the visible light for the interference is radiated from the front of the screen, and interfering against an illegal activity is achieved by using a reflected light off a surface of the screen.

15. The system of claim 10 further comprising a plurality of units of the visible light radiation means, and a control means for the visible light radiation means radiates the visible light for the interference at a plurality of locations on the screen in prescribed combinations, in such a way that a two dimensional optical image pattern is simultaneously recorded, when an image on the screen is illegally image captured.

16. The system of claim 10 further comprising, a light shuttering period detection means for detecting a period during which a projection light is shuttered by a frame forwarding shutter;

a calculation means for determining a luminance of a white color light for the interference based on an average luminance between a previous frame and an ensuing frame in a target image pixel; and a control means for projecting the white color light for the interference on to the target image pixel during the period in which the projection light is shuttered.

17. The system of claim 10 further comprising, a light shuttering period detection means for detecting a time period in which a projection light is shuttered by a frame forwarding shutter;

a calculation means for determining a luminance and a chromaticity of the visible light for the interference, based on an average luminance and an average chromaticity between a previous frame and an ensuing frame in a target image pixel; and a control means for projecting the visible light for the interference onto the target image pixel during a period in which the projection light is shuttered.

18. The system of claim 10 further comprising radiation direction drive means for driving the visible light radiation means and changing its directions of radiation;

a storage means for storing radiation direction information for the visible light radiation means that correspond with screen sizes; and a radiation direction control means for automatically adjusting the direction of radiation of the visible light for the interference, which is an output from the visible light radiation means, by reading out appropriate radiation direction information from the storage means, when an instruction for changing the screen size is detected, and providing a read-out radiation direction information to the radiation direction drive means.

* * * * *